(12) United States Patent
Jakubowski et al.

(10) Patent No.: US 12,303,050 B2
(45) Date of Patent: *May 20, 2025

(54) TO-GO CUBBY UNIT

(71) Applicant: HATCO CORPORATION, Milwaukee, WI (US)

(72) Inventors: James Jakubowski, Milwaukee, WI (US); Gerhard Wenzel, Sussex, WI (US); Michael Ross, Milwaukee, WI (US); Taylor Bley, Milwaukee, WI (US); Jim Virgin, Milwaukee, WI (US); Nicholas Bassill, Milwaukee, WI (US)

(73) Assignee: HATCO CORPORATION, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,660

(22) Filed: Mar. 11, 2024

(65) Prior Publication Data

US 2024/0206659 A1 Jun. 27, 2024

Related U.S. Application Data

(63) Continuation of application No. 17/884,182, filed on Aug. 9, 2022, now Pat. No. 11,957,259, which is a (Continued)

(51) Int. Cl.
*A47G 29/14* (2006.01)
*A47F 7/00* (2006.01)
(Continued)

(52) U.S. Cl.
CPC ............ *A47G 29/14* (2013.01); *A47F 7/0071* (2013.01); *A47F 10/02* (2013.01); *A47F 10/06* (2013.01);
(Continued)

(58) Field of Classification Search
CPC .......... A47J 39/00; A47J 39/006; A47J 39/02; A47J 27/12; A47J 27/122; A47J 47/01;
(Continued)

(56) References Cited

U.S. PATENT DOCUMENTS 6,102,162 A 8/2000 Teicher
7,102,103 B2 9/2006 Fortmann
(Continued)

FOREIGN PATENT DOCUMENTS

CA 2819864 A1 6/2012
CA 2819883 A1 6/2012
(Continued)

*Primary Examiner* — Andrew Roersma
(74) *Attorney, Agent, or Firm* — Foley & Lardner LLP

(57) ABSTRACT

A cubby unit includes a plurality of cubbies and one or more processing circuits. Each of the plurality of cubbies includes a cubby housing defining an internal compartment, a light disposed within the internal compartment, and a door. The door facilitates accessing the internal compartment of the cubby housing. At least a portion of the door is transparent. The one or more processing circuits are configured to to acquire access information, determine whether the access information is associated with a respective order within a respective cubby of the plurality of cubbies, and activate the light of the respective cubby in response to the access information being associated with the respective order such that light emitted by the light shines through the portion of the door that is transparent of the respective cubby to indicate in which one of the plurality of cubbies the respective order is located.

16 Claims, 16 Drawing Sheets

Related U.S. Application Data continuation of application No. 16/776,056, filed on Jan. 29, 2020, now Pat. No. 11,445,845.

(60) Provisional application No. 62/798,757, filed on Jan. 30, 2019.

(51) Int. Cl.
| | |
|---|---|
| *A47F 10/02* | (2006.01) |
| *A47F 10/06* | (2006.01) |
| *A47J 39/00* | (2006.01) |
| *A47J 39/02* | (2006.01) |
| *A47J 47/01* | (2006.01) |
| *A47J 47/14* | (2006.01) |
| *G06Q 50/12* | (2012.01) |
| *G07C 9/00* | (2020.01) |
| *G07F 11/62* | (2006.01) |
| *G07F 17/00* | (2006.01) |
| *G07F 17/12* | (2006.01) |

(52) U.S. Cl.
CPC ............ *A47G 29/141* (2013.01); *A47J 39/00* (2013.01); *A47J 39/006* (2013.01); *A47J 39/02* (2013.01); *A47J 47/01* (2013.01); *A47J 47/14* (2013.01); *G06Q 50/12* (2013.01); *G07C 9/00174* (2013.01); *G07F 11/62* (2013.01); *G07F 17/0064* (2013.01); *G07F 17/0078* (2013.01); *G07F 17/12* (2013.01); *A47G 2029/142* (2013.01); *A47G 2029/145* (2013.01); *A47G 2029/147* (2013.01)

(58) Field of Classification Search
CPC ....... A47J 47/14; A47G 29/14; A47G 29/141; A47G 2029/142; A47G 2029/147; A47F 10/02; A47F 10/06; A47F 7/0071; G07F 9/10; G07F 9/105; G07F 11/62; G07F 17/0064; G07F 17/0071; G07F 17/0078; G07F 17/12; G06Q 50/12

See application file for complete search history.

(56) References Cited

U.S. PATENT DOCUMENTS

| | | | |
|---|---|---|---|
| 7,220,946 B2 | 5/2007 | Majchrzak et al. | |
| 7,394,042 B2 | 7/2008 | Fortmann | |
| 8,124,200 B2 | 2/2012 | Quella et al. | |
| 8,134,101 B2 | 3/2012 | Majchrzak | |
| 8,968,848 B2 | 3/2015 | Quella et al. | |
| 9,557,209 B2 | 1/2017 | Savage et al. | |
| 9,663,974 B2 | 5/2017 | Savage et al. | |
| 10,288,361 B2 | 5/2019 | Wenzel | |
| 11,445,845 B2 | 9/2022 | Jakubowski et al. | |
| 11,957,259 B2 * | 4/2024 | Jakubowski | G07F 11/62 |
| 2013/0144428 A1 | 6/2013 | Irwin et al. | |
| 2015/0294260 A1 | 10/2015 | Napoli | |
| 2016/0200517 A1 | 7/2016 | Savage et al. | |
| 2016/0208543 A1 | 7/2016 | Savage et al. | |
| 2017/0071410 A1 | 3/2017 | Veltrop et al. | |
| 2017/0215620 A1 | 8/2017 | Dade et al. | |
| 2017/0217011 A1 | 8/2017 | Savage et al. | |
| 2017/0299249 A1 | 10/2017 | Dade et al. | |
| 2017/0307289 A1 | 10/2017 | Rigaud et al. | |
| 2018/0014635 A1 | 1/2018 | Turner et al. | |
| 2018/0103803 A1 | 4/2018 | Laub et al. | |
| 2018/0130017 A1 | 5/2018 | Gupte | |
| 2018/0299192 A1 | 10/2018 | Clark et al. | |
| 2018/0328099 A1 | 11/2018 | Whitaker et al. | |
| 2018/0338354 A1 | 11/2018 | Bassill et al. | |
| 2018/0350177 A1 | 12/2018 | Dautz et al. | |
| 2018/0352612 A1 | 12/2018 | Hofleitner et al. | |
| 2018/0357843 A1 | 12/2018 | Zurkuhlen et al. | |
| 2019/0043298 A1 | 2/2019 | Moudy | |
| 2020/0128991 A1 | 4/2020 | Jessie | |
| 2020/0175802 A1 | 6/2020 | Crawford et al. | |

FOREIGN PATENT DOCUMENTS

| | | | | |
|---|---|---|---|---|
| CN | 105686693 A | | 6/2016 | |
| CN | 106952408 A | | 7/2017 | |
| CN | 107730764 A | | 2/2018 | |
| CN | 108133552 A | * | 6/2018 | ........... G06Q 10/083 |
| CN | 108197859 A | | 6/2018 | |
| DE | 20006161 U1 | * | 6/2000 | ........... A47G 29/141 |
| EP | 2 649 597 B1 | | 10/2013 | |
| EP | 2950283 A1 | * | 12/2015 | ......... G06Q 10/0836 |
| GB | 2 398 834 A | | 9/2004 | |
| GB | 2 522 726 A | | 8/2015 | |
| GB | 2 549 127 A | | 10/2017 | |
| WO | WO-2017/041145 A1 | | 3/2017 | |
| WO | WO-2018/213270 A1 | | 11/2018 | |

* cited by examiner

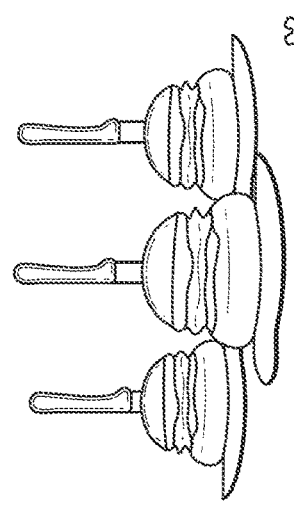

TO-GO CUBBY UNIT

CROSS-REFERENCE TO RELATED PATENT APPLICATION

This application is a continuation of U.S. patent application Ser. No. 17/884,182, filed Aug. 9, 2022, which is a continuation of U.S. patent application Ser. No. 16/776,056, filed Jan. 29, 2020, which claims the benefit of and priority to U.S. Provisional Patent Application No. 62/798,757, filed Jan. 30, 2019, all of which are incorporated herein by reference in their entireties.

BACKGROUND

Restaurant to-go cubbies are typically unattended and open to the ambient environment. A customer can therefore take food from such to-go cubbies that does not belong to them and/or the food may cool off or warm up to an undesirable temperature while waiting to be picked up by a customer.

SUMMARY

One embodiment relates to a cubby unit. The cubby unit includes a plurality of cubbies and one or more processing circuits. Each of the plurality of cubbies includes a cubby housing defining an internal compartment, a light disposed within the internal compartment, and a door coupled to the cubby housing. The door facilitates accessing the internal compartment of the cubby housing. At least a portion of the door is transparent. The one or more processing circuits include one or more memory devices coupled to one or more processors. The one or more memory devices store instructions thereon that, when executed by the one or more processors, cause the one or more processors to acquire access information, determine whether the access information is associated with a respective order within a respective cubby of the plurality of cubbies, and activate the light of the respective cubby in response to the access information being associated with the respective order such that light emitted by the light shines through the portion of the door that is transparent of the respective cubby to indicate in which one of the plurality of cubbies the respective order is located.

Another embodiment relates to a cubby unit. The cubby unit includes a plurality of cubbies and one or more processing circuits. The plurality of cubbies includes a first cubby and a second cubby. Each of the first cubby and the second cubby includes a cubby housing defining an internal compartment, a light disposed within the internal compartment, and a door coupled to the cubby housing. The door facilitates accessing the internal compartment of the cubby housing. At least a portion of the door is transparent. The one or more processing circuits include one or more memory devices coupled to one or more processors. The one or more memory devices store instructions thereon that, when executed by the one or more processors, cause the one or more processors to acquire access information, determine whether the access information is associated with a respective order within a respective one of the first cubby or the second cubby, and control the light of the respective one of the first cubby or the second cubby in response to the access information being associated with the respective order to indicate in which one of the first cubby or the second cubby the respective order is located.

Still another embodiment relates to a cubby unit. The cubby unit includes a first display positioned on a first side of the cubby unit, a second display positioned on an opposing second side of the cubby unit, a scanner positioned on the opposing second side of the cubby unit, a plurality of cubbies, and a thermal management system. The plurality of cubbies includes a first cubby and a second cubby. Each of the first cubby and the second cubby includes a cubby housing defining an internal compartment, a light disposed within the internal compartment, a first door positioned on the first side of the cubby unit, a second door positioned on the opposing second side of the cubby unit, at least a portion of the first door and the second door is transparent, and a locking mechanism positioned to selectively lock and unlock the second door. The thermal management system is configured to thermally regulate a temperature within the internal compartment of at least one of the first cubby or the second cubby. The cubby unit is sized to fit on top of a counter.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 14-16 show various graphical user interfaces that facilitate an operator of the cubby unit of FIG. 1 with selecting and classifying a respective one of the plurality of compartments for an order, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a cubby unit (e.g., a to-go cubby unit, a temperature regulating cubby unit, a temperature regulation unit, etc.) includes a plurality of compartments (e.g., temperature controlled cubbies, ambient cubbies, beverage cubbies, pass-through cubbies, lockable cubbies, etc.). One or more of the plurality of compartments may be temperature regulating compartments that include (i) a warming assembly that utilizes heating mechanisms (e.g., induction heaters, radiant heaters, Peltier devices, blanket heaters, strip heaters, etc.) to heat or maintain a warm temperature of a food product and/or (ii) a cooling assembly including cooling mechanisms (e.g., an evaporative gas cooling system, a Peltier cooling system, cooling coils, Peltier devices, etc.) to cool or maintain a cold temperature of a product. The one or more temperature regulating compartments may be configured to maintain an ambient temperature, maintain an elevated temperature relative to the ambient temperature, and/or maintain a reduced temperature relative to the ambient temperature. In some embodiments, at least one of the one or more temperature regulating compartments includes two or more zones, where each of the zones may be maintained at a different temperature relative to the other zone(s) (e.g., one hot zone and one cold zone, one hot zone and one warm zone, one warm zone and one ambient temperature zone, one cold zone and one ambient temperature zone, etc.). One or more of the plurality of compartments may be configured to facilitate selective access to a to-go food order or other items stored therein based on a customer or customer device providing an appropriate credential (e.g., a personal identification number ("PIN") or code, a biometric identifier, a barcode, a quick response ("QR") code, a mobile credential, etc.) to the temperature regulation unit associated with the to-go order/items. Such a temperature regulation unit may advantageously (i) maintain a to-go food order at a desirable temperature until the customer arrives to pick it up and/or (ii) prevent other people (i.e., people who did not order the particular to-go food order) from accessing the to-go food order/items of the rightful customer.

Figure 1:
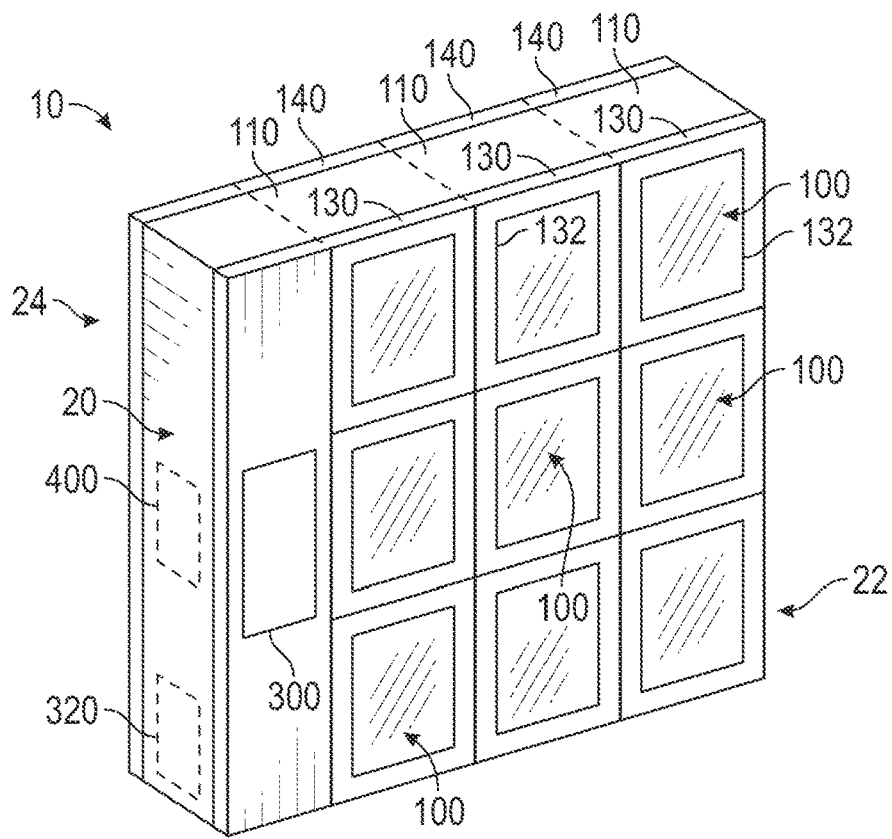
FIG. 1 is a front perspective view of a cubby unit having a plurality of compartments, according to an exemplary embodiment.
Figure 2:
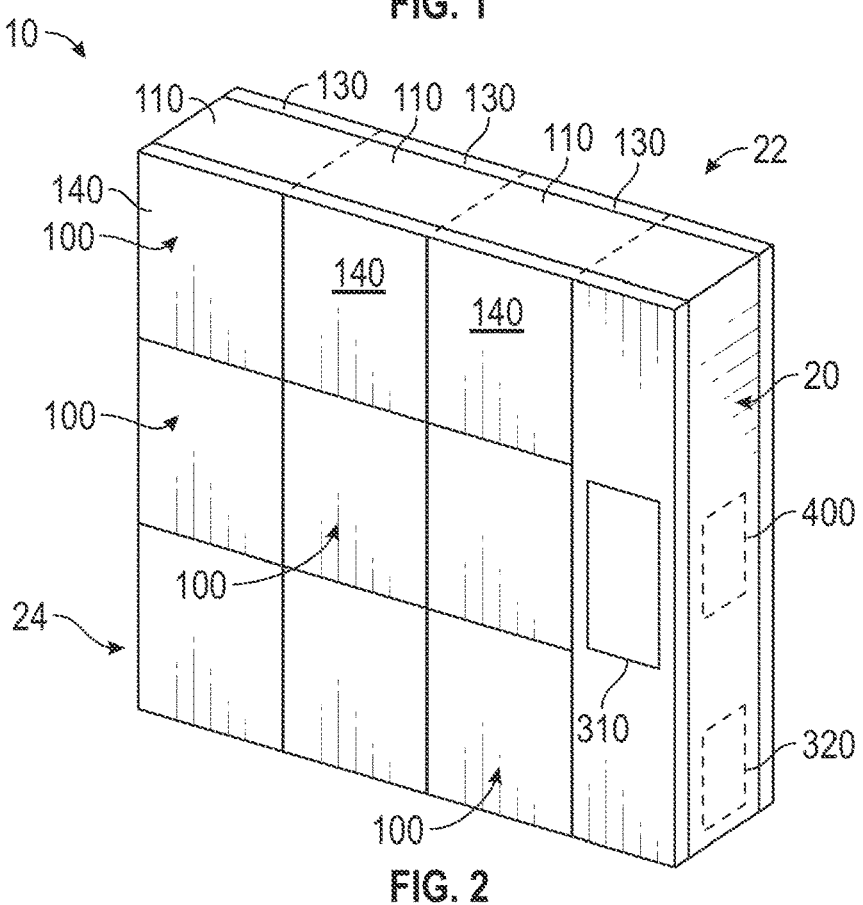
FIG. 2 is a rear perspective view of the cubby unit of FIG. 1, according to an exemplary embodiment.

According to the exemplary embodiment shown in FIGS. 1 and 2, a temperature regulation unit, shown as to-go cubby unit 10, includes a housing or enclosure, shown as unit housing 20, having a first side, shown as customer side 22, and an opposing second side, shown as employee side 24. The unit housing 20 of the to-go cubby unit 10 includes a plurality of compartments or lockers, shown as to-go cubbies 100, extending between the customer side 22 and the employees side 24 of the unit housing 20; a first human-machine interface ("HMI"), shown as customer interface 300, disposed along the customer side 22 of the unit housing 20; a second HMI, shown as employee interface 310, disposed along the employee side 24 of the unit housing 20; and a control system, shown as control unit 400, disposed within the unit housing 20. In some embodiments, the to-go cubby unit 10 does not include the customer interface 300 and/or the employee interface 310. In some embodiments, the unit housing 20 includes mounting brackets that facilitate mounting or securing the to-go cubby unit 10 to a wall, the floor, a counter, a shelf, etc. In some embodiments, the unit housing 20 includes wheels that facilitate easy repositioning of the to-go cubby unit 10.

As shown in FIGS. 1 and 2, the to-go cubby unit 10 includes nine to-go cubbies 100. In other embodiments, the to-go cubby unit 10 includes a different number of the to-go cubbies 100 (e.g., one, two, three, four, five, six, seven, eight, ten, twelve, fifteen, twenty, twenty-five, thirty, etc.). While the to-go cubbies 100 are shown as being similar in size, the size of the to-go cubbies 100 may vary to accommodate different sized orders (e.g., small cubbies, medium cubbies, large cubbies, a multi-party order, a single person order, a large electronic device, a small electronic device, etc.), differently shaped containers (e.g., a pizza box, a takeout bag, a coffee cup, etc.).

As shown in FIGS. 1 and 2, each of the to-go cubbies 100 includes a housing, shown as cubby housing 110; a first door, shown as customer door 130, positioned along the customer side 22 of the unit housing 20; and a second door, shown as employee door 140, positioned along the employee side 24 of the unit housing 20. According to an exemplary embodiment, the customer doors 130 and the employee doors 140 cooperatively provide a "pass-through" design for the to-go cubbies 100. In one embodiment, the cubby housings 110 at least partially form the unit housing 20. In other embodiments, the cubby housings 110 are releasably received within the unit housing 20 (e.g., to facilitate removal of a respective to-go cubby 100, to facilitate replacing a respective to-go cubby 100, for repair, a modular design, etc.). By way of example, the unit housing 20 may include front and/or rear bezel that is removable. When the front and/or rear bezel is removed, the to-go cubbies 100 may be selectively removed from the unit housing 20.

In some embodiments, one or more of the to-go cubbies 100 do not includes the employee doors 140, but rather the employee doors 140 are replaced with a fixed panel (i.e., a non-pass-through design). In some embodiments, one or more of the to-go cubbies 100 do not include the customer doors 130 such that the one or more to-go cubbies 100 are open along the customer side 22. In some embodiments, one or more of the to-go cubbies 100 do not include the employee doors 140 such that the one or more to-go cubbies 100 are open along the employee side 24. In some embodiments, one or more of the to-go cubbies 100 do not include the customer doors 130 and employee doors 140 such that the one or more to-go cubbies 100 are open along the customer side 22 and the employee side 24.

Figure 13:
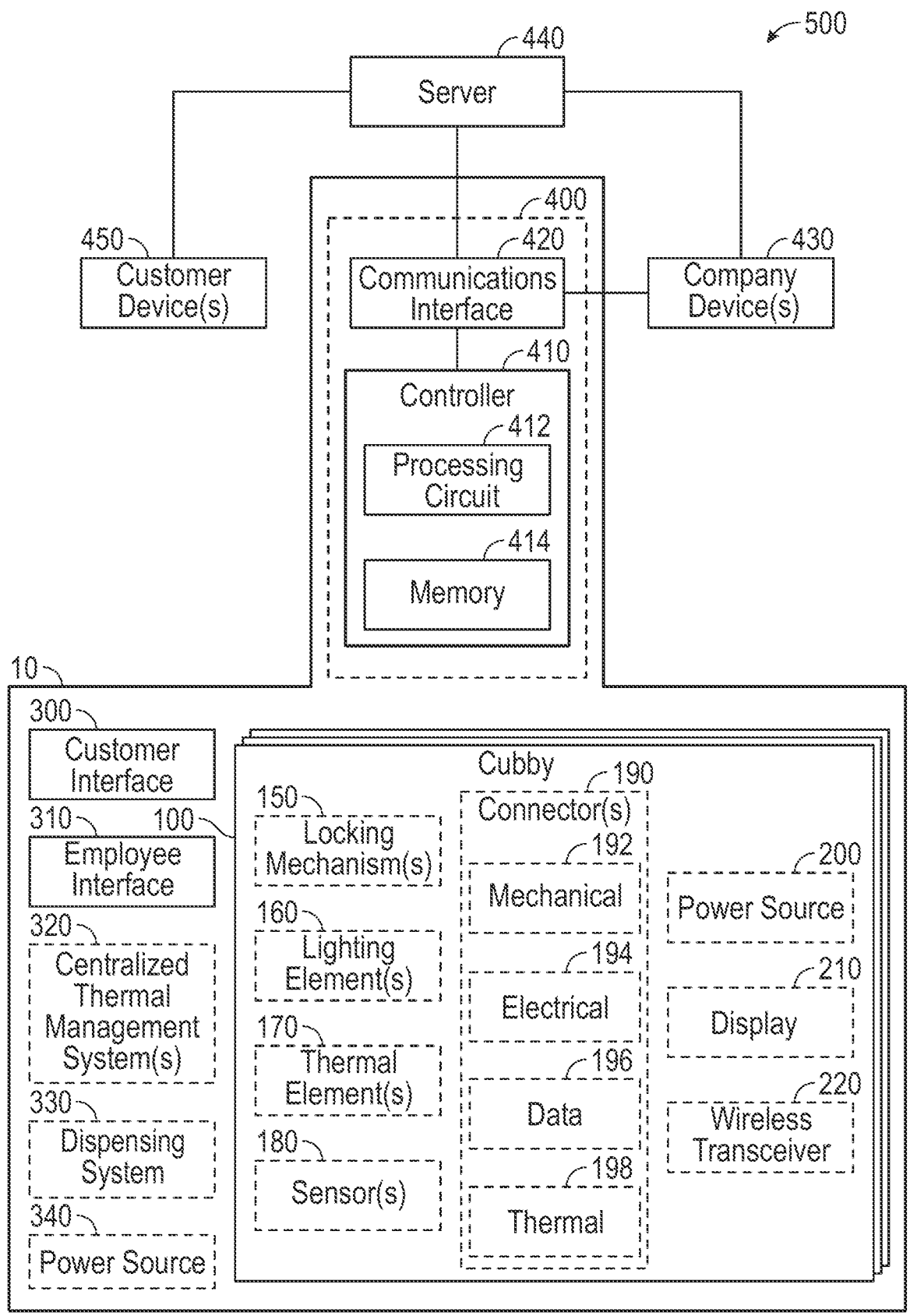
FIG. 13 is a schematic diagram of point of sale system including the cubby unit of FIG. 1, according to an exemplary embodiment.

As shown in FIG. 1, each of the customer doors 130 includes a transparent portion, shown as transparent panel 132. In some embodiments, the customer doors 130 do not include the transparent panels 132. By way of example, the customer doors 130 may be solid (e.g., a sheet steel panel, to conceal the contents stored within the to-go cubbies 100 from customers, etc.). In some embodiments, as shown in FIG. 13, one or more of the to-go cubbies 100 additionally or alternatively include a display device, shown as display 210, (e.g., positioned along the customer doors 130, the employee doors 140, etc.) that provides identifying information for the order within the to-go cubbies 100 (e.g., a name of the customer associated with the order therein, the order number, another identifier, etc.). The display 210 may be a display screen, an LED screen, an LCD screen, and/or any other suitable device that can display the identifying information. In some embodiments, the identifying information is alternatively displayed on the transparent panels 132 (e.g., similar to a heads-up display, etc.). As shown in FIG. 2, the employee doors 140 are solid and do not similarly include transparent panels. In some embodiments, the employee doors 140 include transparent panels (e.g., similar to the transparent panels 132, etc.) and/or displays 210. Accordingly, (i) the customer doors 130 may be see-through and the employee doors 140 may be solid, (ii) the employee doors 140 may be see-through and the customer doors 130 may be solid, (iii) both the customer doors 130 and the employee doors 140 may be see-through, or (iv) neither the customer doors 130 nor the employee doors 140 may be see-through (i.e., both the customer doors 130 and the employee doors 140 are solid).

Figure 3:
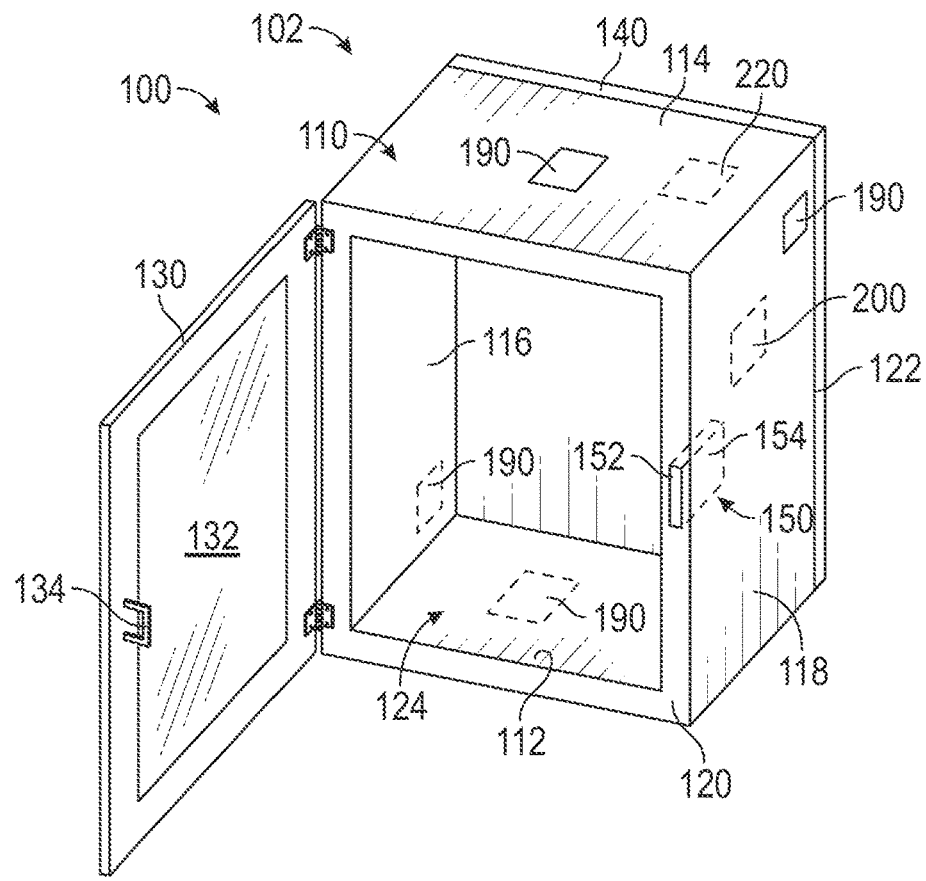
FIG. 3 is a perspective view of a temperature regulating compartment of the plurality of compartments of the cubby unit of FIG. 1, according to an exemplary embodiment.
Figure 4:
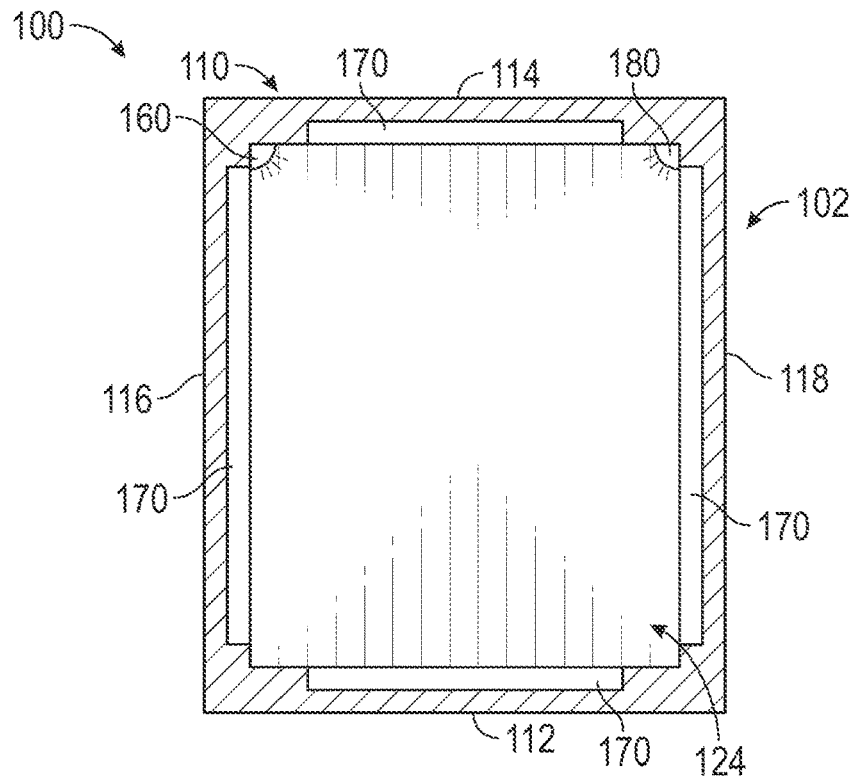
FIG. 4 is a cross-sectional view of the temperature regulating compartment of FIG. 3, according to an exemplary embodiment.
Figure 5A:
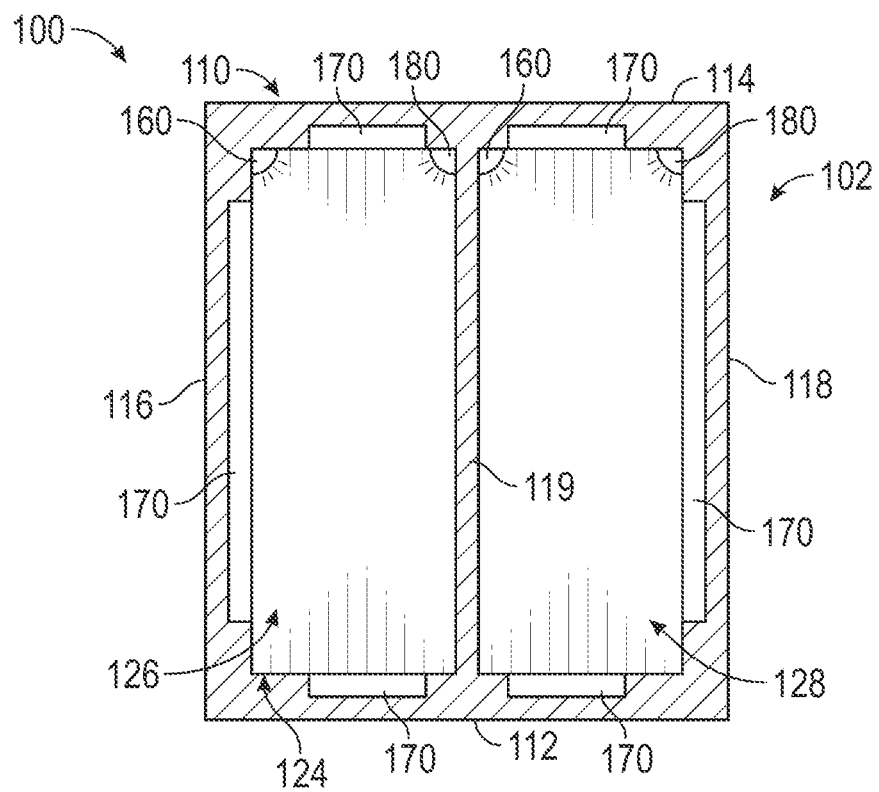
FIGS. 5A-5D show various cross-sectional views of the temperature regulating compartment of FIG. 3, according to various other exemplary embodiments.
Figure 5B:
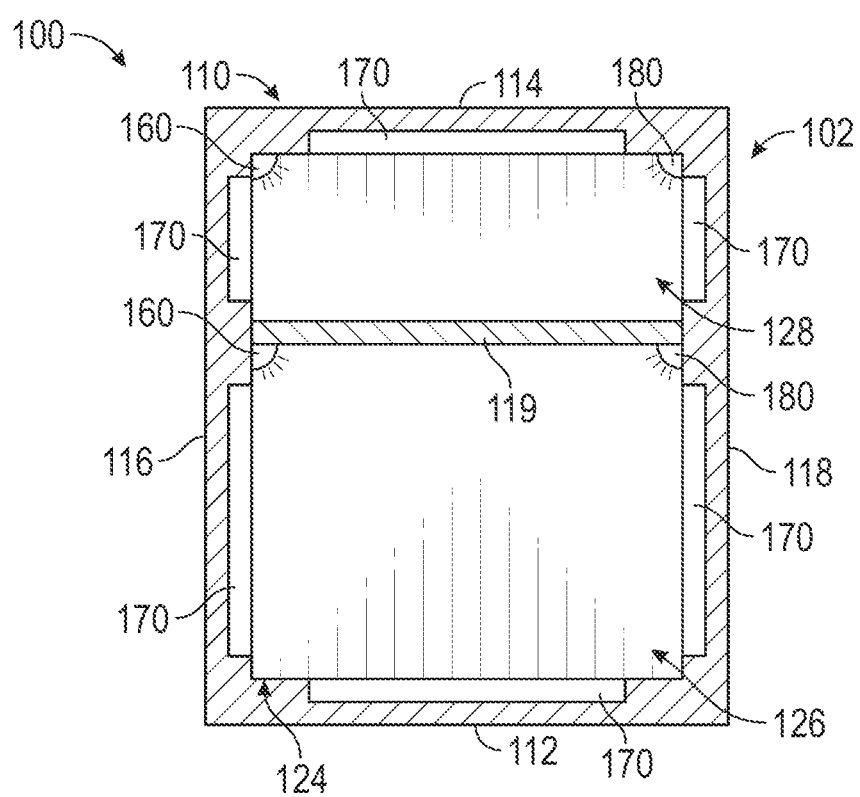
Figure 5C:
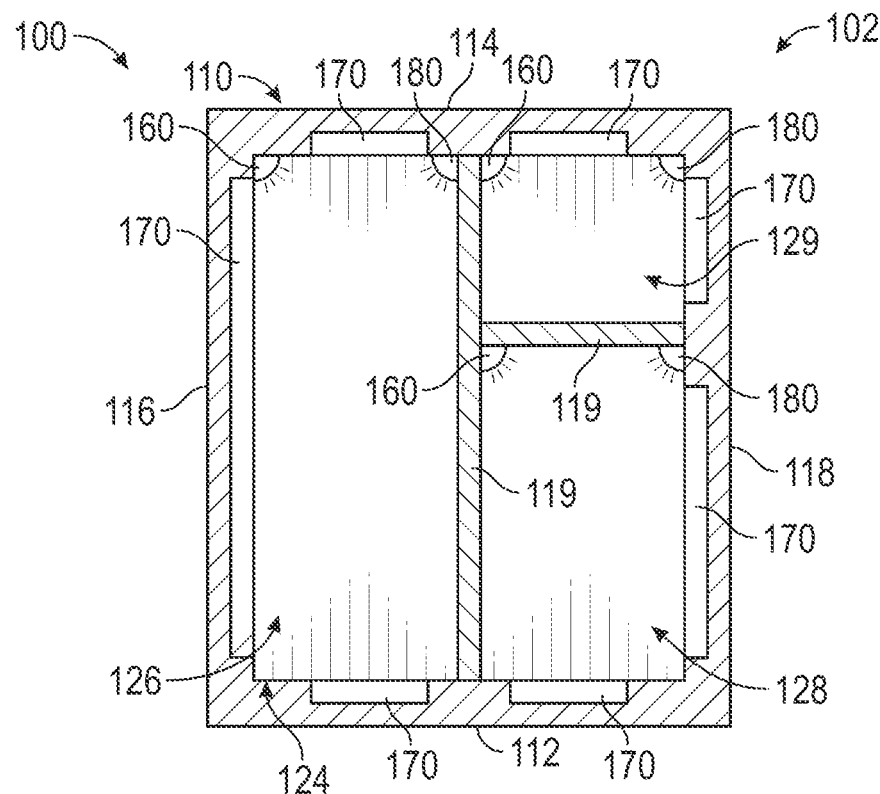
Figure 5D:
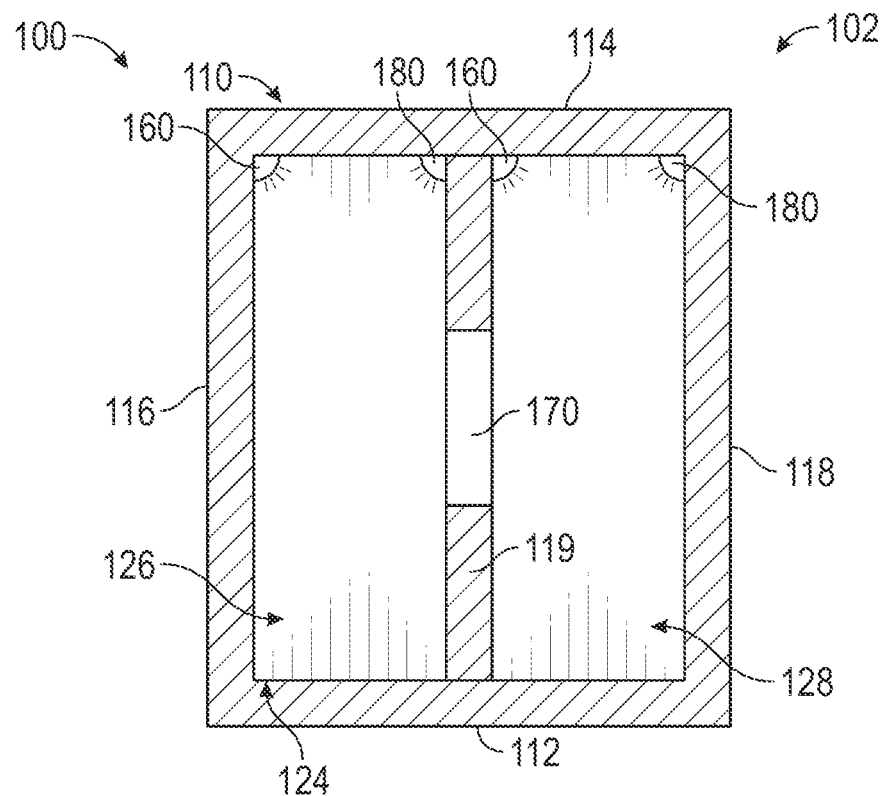

As shown in FIGS. 3-5D, a first type of the to-go cubbies 100, shown as to-go cubby 102, includes the cubby housing 110 having a first wall, shown as bottom wall 112, a second wall, shown as top wall 114, a third wall, shown as first sidewall 116, and a fourth wall, shown as second sidewall 118. As shown in FIGS. 3 and 4, the bottom wall 112, the top wall 114, the first sidewall 116, and the second sidewall 118 cooperatively define an internal cavity, shown as internal compartment 124. As shown in FIGS. 5A-5D, the cubby housing 110 includes one or more partitions, shown as divider walls 119. As shown in FIGS. 5A and 5D, a vertical divider wall 119 extends between the bottom wall 112 and the top wall 114, separating the internal compartment 124 into sub-compartments including (i) a first zone, shown as first sub-compartment 126, defined by the bottom wall 112, the top wall 114, the first sidewall 116, and the divider wall 119 and (ii) a second zone, shown as second sub-compartment 128, defined by the bottom wall 112, the top wall 114, the second sidewall 118, and the divider wall 119. As shown in FIG. 5B, a horizontal divider wall 119 extends between the first sidewall 116 and the second sidewall 118, separating the internal compartment 124 into (i) the first sub-compartment 126, defined by the bottom wall 112, the first sidewall 116, the second sidewall 118, and the divider wall 119 and (ii) the second sub-compartment 128, defined by the top wall 114, the first sidewall 116, the second sidewall 118, and the divider wall 119. In some embodiments, the first sub-compartment 126 and the second sub-compartment 128 are the same size. In some embodiments, the first sub-compartment 126 and the second sub-compartment 128 are different sizes (i.e., one is larger than the other). In some embodiments, the cubby housing 110 includes a plurality of divider walls 119 to separate the internal compartment 124 into three or more sub-compartments. As shown in FIG. 5C, a vertical divider wall 119 and a horizontal divider wall 119 separate the internal compartment into the first sub-compartment 126, the second sub-compartment 128, and a third zone, shown as third sub-compartment 129. In other embodiments, the internal compartment 124 is divided into four or more sub-compartments. In some embodiments, the divider walls 119 selectively translatable or otherwise repositionable (e.g., left to right, up and down, etc.) within the internal compartment 124. In some embodiments, the divider walls 119 are selectively removable from the internal compartment 124. Accordingly, the owner of the to-go cubby unit 10 may therefore be able to design the internal arrangement of each of the to-go cubbies 102 of the to-go cubby unit 10 using the divider walls 119 based on his or her needs.

In some embodiments, the customer doors 130 and/or the employee doors 140 are replaced with a plurality of separate doors for the to-go cubbies 102 that include the divider walls 119. By way of example, the to-go cubbies 102 may include (i) a first customer door 130 and/or a first employee door 140 for the first sub-compartment 126, (ii) a second customer door 130 and/or a second employee door 140 for the second sub-compartment 128, and (iii) a third customer door 130 and/or a third employee door 140 for the third sub-compartment 129. By way of another example, the to-go cubbies 102 may include (i) a first customer door 130 and/or a first employee door 140 for the first sub-compartment 126 and (ii) a second customer door 130 and/or a second employee door 140 for the second sub-compartment 128 and the third sub-compartment 129.

As shown in FIG. 3, the cubby housing 110 defines a first face, shown as front face 120, and an opposing second face, shown as rear face 122. The customer door 130 is pivotally coupled to the front face 120 (e.g., at an end of the first sidewall 116, etc.) to facilitate selectively accessing the internal compartment 124 though an opening in the front face 120. According to an exemplary embodiment, the employee door 140 is pivotally coupled to the rear face 122 to facilitate selectively accessing the internal compartment 124 though an opening in the rear face 122. In other embodiments, the customer door 130 and/or the employee door 140 are slidably coupled to or otherwise repositionable relative to the front face 120 and/or the rear face 122, respectively.

As shown in FIG. 3, the to-go cubby 102 includes a lock device, shown as locking mechanism 150, disposed within an internal cavity, shown as locking slot 154, defined within the second sidewall 118. According to an exemplary embodiment, the locking mechanism 150 is an electronic locking mechanism. As shown in FIG. 3, the locking slot 154 is exposed by an aperture, shown as locking aperture 152, defined in the front face 120 at an end of the second sidewall 118. In other embodiments, the locking aperture 152, the locking slot 154, and the locking mechanism 150 are otherwise positioned (e.g., at an end of the top wall 114, at an end of the bottom wall 112, etc.). In some embodiments, the to-go cubby 102 includes a plurality of the locking mechanisms 150 (e.g., one positioned along the bottom wall 112 and one positioned along the top wall 114, etc.)

As shown in FIG. 3, the customer door 130 includes a retainer, shown as retainer 134. According to an exemplary embodiment, the locking aperture 152 and the locking slot 154 are positioned to selectively receive the retainer 134 and the locking mechanism 150 is positioned to selectively engage the retainer 134 to secure (e.g., lock, etc.) the customer door 130 to the front face 120 of the cubby housing 110 to prevent the customer door 130 from being opened by an unauthorized person. In another embodiment, the locking mechanism 150 is replaced with an electromagnet and the retainer 134 is replaced with a magnetically attractive material (e.g., a metal plate, etc.). In other embodiments, another suitable mechanism is used that facilitates selectively securing the customer door 130 to the front face 120 of the cubby housing 110. In some embodiments, the to-go cubby 102 additionally or alternatively includes a similar locking mechanism and retainer for the rear face 122 of the cubby housing 110 and the employee door 140, respectively. In some embodiments, the to-go cubby 102 does not includes the locking mechanism 150 (e.g., the customer door 130 and the employee door 140 do not lock, etc.).

As shown in FIGS. 4-5D, the to-go cubby 102 includes one or more light sources, shown as lighting elements 160, disposed within the internal compartment 124, the first sub-compartment 126, the second sub-compartment 128, and/or the third sub-compartment 129. The lighting elements 160 may be or include light bulbs (e.g., incandescent light bulbs, etc.), light emitting diodes ("LEDs"), and/or still another suitable type of light source. According to an exemplary embodiment, the lighting elements 160 are positioned to selectively illuminate the internal compartment 124, the first sub-compartment 126, the second sub-compartment 128, and/or the third sub-compartment 129.

As shown in FIGS. 4-5D, the to-go cubby 102 includes one or more thermal elements, shown as thermal elements 170. While shown to be disposed around the internal compartment 124, the thermal elements 170 may be positioned along one or more of the bottom wall 112, the top wall 114, the first sidewall 116, and the second sidewall 118 (e.g., only along the bottom wall 112, only along the first sidewall 116, only along the second sidewall 118, along the bottom wall 112 and the top wall 114, along the bottom wall 112 and the first sidewall 116, along the bottom wall 112 and the second sidewall 118, along the first sidewall 116 and the second sidewall 118, etc.). In some embodiments, one or more of the thermal elements 170 are additionally or alternatively positioned along or within the divider wall(s) 119. In some embodiments, one or more of the thermal elements 170 are additionally or alternatively positioned along or within the employee door 140 (e.g., if the employee door 140 does not include a transparent panel 132, etc.), the customer door 130 (e.g., if the customer door 130 does not include a transparent panel, etc.), a back wall of the unit housing 20 (e.g., if the to-go cubbies 102 do not include the employee doors 140, etc.). In some embodiments, each of the to-go cubbies 102 includes a temperature control interface (e.g., a thermostat, a temperature controller, etc.) to control the thermal elements 170 thereof. In other embodiments, the thermal elements 170 of the to-go cubbies 102 are controlled with the employee interface 310 or still otherwise controlled.

In some embodiments, the thermal elements 170 of the to-go cubby 102 are or include heating elements. By way of example, the heating elements may be positioned to thermally regulate the temperature within the internal compartment 124, the first sub-compartment 126, the second sub-compartment 128, and/or the third sub-compartment 129 at an elevated temperature relative to the ambient environment to warm or heat a food product therein to maintain a desirable temperature (e.g., a target temperature, etc.) of the food product. By way of another example, in embodiments where the cubby housing 110 includes the divider wall 119, the heating elements of the to-go cubby 102 may facilitate providing a multi-zone heating capability with (i) the heating elements associated with the first sub-compartment 126 configured to operate to provide a first temperature within the first sub-compartment 126, (ii) the heating elements associated with the second sub-compartment 128 configured to operate to provide a second temperature within the second sub-compartment 128, independent of the first temperature, and/or (iii) the heating elements associated with the third sub-compartment 129 configured to operate to provide a third temperature within the third sub-compartment 129, independent of the first temperature and the second temperature. The heating elements may include a heating coil, a strip heater, a Peltier device, a resistive heating element, a radiant heating element, a tubular element or conduit that receives a heated working fluid, a blanket heating element, an induction heating element, and/or still other suitable types of heating elements.

In some embodiments, the thermal elements 170 of the to-go cubby 102 are or include cooling elements. By way of example, the cooling elements may be positioned to thermally regulate the temperature within the internal compartment 124, the first sub-compartment 126, the second sub-compartment 128, and/or the third sub-compartment 129 at a reduced temperature relative to the ambient environment to cool a food product therein to maintain a desirable temperature (e.g., a target temperature, etc.) of the food product. By way of another example, in embodiments where the cubby housing 110 includes the divider wall 119, the cooling elements of the to-go cubby 102 may facilitate providing a multi-zone cooling capability with (i) the cooling elements associated with the first sub-compartment 126 configured to operate to provide a first temperature within the first sub-compartment 126, (ii) the cooling elements associated with the second sub-compartment 128 configured to operate to provide a second temperature within the second sub-compartment 128, independent of the first temperature, and/or (iii) the cooling elements associated with the third sub-compartment 129 configured to operate to provide a third temperature within the third sub-compartment 129, independent of the first temperature and the second temperature. The cooling elements may include cooling coils that receive a cooled working fluid, a thermoelectric cooler, a Peltier device, a solid-state refrigeration system, and/or still other suitable types of cooling elements.

In some embodiments, the thermal elements 170 of the to-go cubby 102 include a combination of heating elements and cooling elements. By way of example, one of the heating elements or the cooling elements may be operated at a time to provide either a heating operation or a cooling operation within the to-go cubby 102. By way of example, in embodiments where the cubby housing 110 includes the divider wall 119, the heating elements and the cooling elements of the to-go cubby 102 may facilitate providing a dual zone heating and cooling capability with (i) the heating elements being associated with the first sub-compartment 126 and configured to operate to provide a first elevated temperature within the first sub-compartment 126 and (ii) the cooling elements being associated with the second sub-compartment 128 and configured to operate to provide a second, reduced temperature within the second sub-compartment 128.

In some embodiments, the thermal elements 170 of the to-go cubby 102 includes dual functioning thermal elements configured to provide both heating and cooling capabilities. By way of example, the thermal elements 170 of the to-go cubby 102 may perform a dual heating and cooling function to facilitate selectively heating or selectively cooling a food product therein (e.g., based on a setting selected by an employee, based on the type of food product, etc.). As an example, the thermal elements 170 may be or include Peltier devices. As another example, the thermal elements may be or include fluid conduits that receive hot and cold fluid. As still another example, the thermal elements 170 may be or include a hot-cold shelf assembly similar to hot-cold shelf assembly disclosed in U.S. Pat. No. 10,288,361, filed Mar. 17, 2015, which is incorporated herein by reference in its entirety. As shown in FIG. 5D, the thermal elements 170 are disposed along or within the divider wall 119. Such an arrangement may facilitate implementing a thermal element that can (i) heat one of the first sub-compartment 126 or the second sub-compartment 128 and (ii) cool the other of the first sub-compartment 126 or the second sub-compartment 128, simultaneously. By way of example, the thermal elements 170 may be or include a Peltier device and/or a thermoelectric cooler that cools one of the first sub-compartment 126 or the second sub-compartment 128. Such a cooling operation generates heat that can be rejected or provided to the other of the first sub-compartment 126 or the second sub-compartment 128 for warming/heating.

In some embodiments (e.g., embodiments where the to-go cubby 102 includes the divider wall 119, etc.), the to-go cubby 102 does not include any of the thermal elements 170 disposed around one or more of the first sub-compartment 126, the second sub-compartment 128, and/or the third sub-compartment 129 such that one or more of the first sub-compartment 126, the second sub-compartment 128, and the third sub-compartment 129 functions as an ambient temperature compartment (i.e., neither heated nor cooled relative to the ambient environment). In some embodiments, at least one of the to-go cubbies 102 of the to-go cubby unit 10 includes only heating elements and at least one of the to-go cubbies 102 of the to-go cubby unit 10 includes only cooling elements. In some embodiments, at least one of the to-go cubbies 102 of the to-go cubby unit 10 is an ambient temperature cubby (i.e., does not include the thermal elements 170).

According to an exemplary embodiment, one or more of the thermal elements 170 are heating elements configured to provide at least one of conductive heat transfer (i.e., conductive heating), convective heat transfer (i.e., convective heating), radiative heat transfer (i.e., radiative heating), and inductive heat transfer (i.e., inductive heating). By way of example, the thermal elements 170 may include a heating element positioned to provide conductive heating to a food product in contact with the bottom wall 112 and/or a horizontal divider wall 119. By way of another example, the thermal elements 170 may additionally or alternatively include a heating element and a fan or blower positioned to provide convective heating to a food product disposed within the internal compartment 124, the first sub-compartment 126, the second sub-compartment 128, and/or the third sub-compartment 129. By way of yet another example, the thermal elements 170 may additionally or alternatively include a heating element positioned to provide radiative heating to a food product disposed within the internal compartment 124. By way of still another example, the thermal elements 170 may additionally or alternatively include a heating element (e.g., an induction coil, etc.) positioned to provide inductive heating to a food product disposed within the internal compartment 124 and in contact with the bottom wall 112 and/or a horizontal divider wall 119. For example, the to-go cubby 102 may include an induction heating system similar to the induction heating system disclosed in U.S. Pat. No. 8,124,200, filed Oct. 25, 2005, and U.S. Pat. No. 8,968,848, filed Feb. 14, 2012, both of which are incorporated herein by reference in their entireties. In such an embodiment, the food product may be wrapped in a wrapper or stored in a bag, box, or other suitable container including a current conducting material similar to the wrapper and the container disclosed in U.S. Pat. Nos. 8,124,200 and 8,698,848. In such an embodiment, the current conducting material may heat the food within its respective container, while the remainder of the bottom wall 112 and/or the horizontal divider wall 119 remains cool (i.e., the portions not in contact with the current conducting material of the container). Accordingly, both (i) food products that are desired to be maintained at an elevated temperature relative the ambient environment (e.g., a hot sandwich, pasta, soup, a burrito, tacos, hot food items, etc.) may be stored in containers including the current conductive material and heated by the induction heating system and (ii) food products that are not desired to be maintained at an elevated temperature (e.g., soda, salad, a cold sandwich, etc.) may be stored in containers that do not include the current conductive material and not be heated by the induction heating system within the same internal compartment 124, the same first sub-compartment 126, the same second sub-compartment 128, and/or the same third sub-compartment 129.

According to an exemplary embodiment, one or more of the thermal elements 170 are cooling elements configured to provide at least one of conductive heat transfer (i.e., conductive cooling) and convective heat transfer (i.e., convective cooling). By way of example, the thermal elements 170 may include a cooling element positioned to provide conductive cooling to a food product in contact with the bottom wall 112 and/or a horizontal divider wall 119. By way of another example, the thermal elements 170 may additionally or alternatively include a cooling element and a fan or blower positioned to provide convective cooling to a food product disposed within the internal compartment 124, the first sub-compartment 126, the second sub-compartment 128, and/or the third sub-compartment 129.

As shown in FIGS. 4-5D, the to-go cubby 102 includes one or more sensors, shown as sensors 180, disposed within the internal compartment 124, the first sub-compartment 126, the second sub-compartment 128, and/or the third sub-compartment 129. According to an exemplary embodiment, the sensors 180 are configured to acquire data (e.g., the identifying characteristics, operating characteristics, etc.) regarding (i) one or more food products entering, within, and/or exiting the internal compartment 124, the first sub-compartment 126, the second sub-compartment 128, and/or the third sub-compartment 129 and/or (ii) the conditions (e.g., temperature, humidity, etc.) within the internal compartment 124, the first sub-compartment 126, the second sub-compartment 128, and/or the third sub-compartment 129.

In some embodiments, the sensors 180 include a temperature sensor configured to acquire data (e.g., temperature data, etc.) regarding a temperature within the internal compartment 124, the first sub-compartment 126, the second sub-compartment 128, and/or the third sub-compartment 129. In some embodiments, the sensors 180 include a humidity sensor configured to acquire data (e.g., humidify data, etc.) regarding a humidity within the internal compartment 124, the first sub-compartment 126, the second sub-compartment 128, and/or the third sub-compartment 129.

In some embodiments, the sensors 180 additionally or alternatively include an optical sensor (e.g., a camera, a scanner, a motion detector, an occupancy sensors, etc.). In some embodiments, the optical sensor is configured to facilitate detecting the presence and/or quantity of a food product or the lack thereof within the internal compartment 124, the first sub-compartment 126, the second sub-compartment 128, and/or the third sub-compartment 129. In some embodiments, the optical sensor is configured to facilitate detecting the type of food product within the internal compartment 124, the first sub-compartment 126, the second sub-compartment 128, and/or the third sub-compartment 129. By way of example, the optical sensor may be configured to read an identifier (e.g., a barcode, a QR code, an ID number, an order number, etc.) on the container (e.g., bag, box, wrapper, etc.) that the food product is stored in to facilitate identifying the type of food product within the internal compartment 124, the first sub-compartment 126, the second sub-compartment 128, and/or the third sub-compartment 129. By way of another example, the optical sensor may be configured to acquire data regarding the size, the shape, the color, the texture, and/or other identifying characteristics of the container storing the food product and/or the food product itself to facilitate optical recognition to determine the type of food product within the internal compartment 124, the first sub-compartment 126, the second sub-compartment 128, and/or the third sub-compartment 129. Such an optical recognition system may be similar to the optical recognition system disclosed in U.S. Patent Publication No. 2018/0338354, filed May 18, 2018, which is incorporated herein by reference in its entirety.

In some embodiments, the sensors 180 additionally or alternatively include a radio-frequency identification ("RFID") reader. In some embodiments, the RFID reader is configured to facilitate detecting the presence and/or quantity of a food product or the lack thereof within the internal compartment 124, the first sub-compartment 126, the second sub-compartment 128, and/or the third sub-compartment 129. In some embodiments, the RFID reader is configured to facilitate detecting the type of food product within the internal compartment 124, the first sub-compartment 126, the second sub-compartment 128, and/or the third sub-compartment 129. By way of example, the RFID reader may be configured to read a RFID tag on the container(s) (e.g., bag, box, wrapper, etc.) that the food product is stored in to facilitate identifying the presence, quantity, and type of food products within the internal compartment 124, the first sub-compartment 126, the second sub-compartment 128, and/or the third sub-compartment 129.

In some embodiments, the sensors 180 additionally or alternatively include a weight sensor. The weight sensor may be positioned to facilitate detecting the presence or lack of a customer order within the internal compartment 124, the first sub-compartment 126, the second sub-compartment 128, and/or the third sub-compartment 129.

Figure 6:
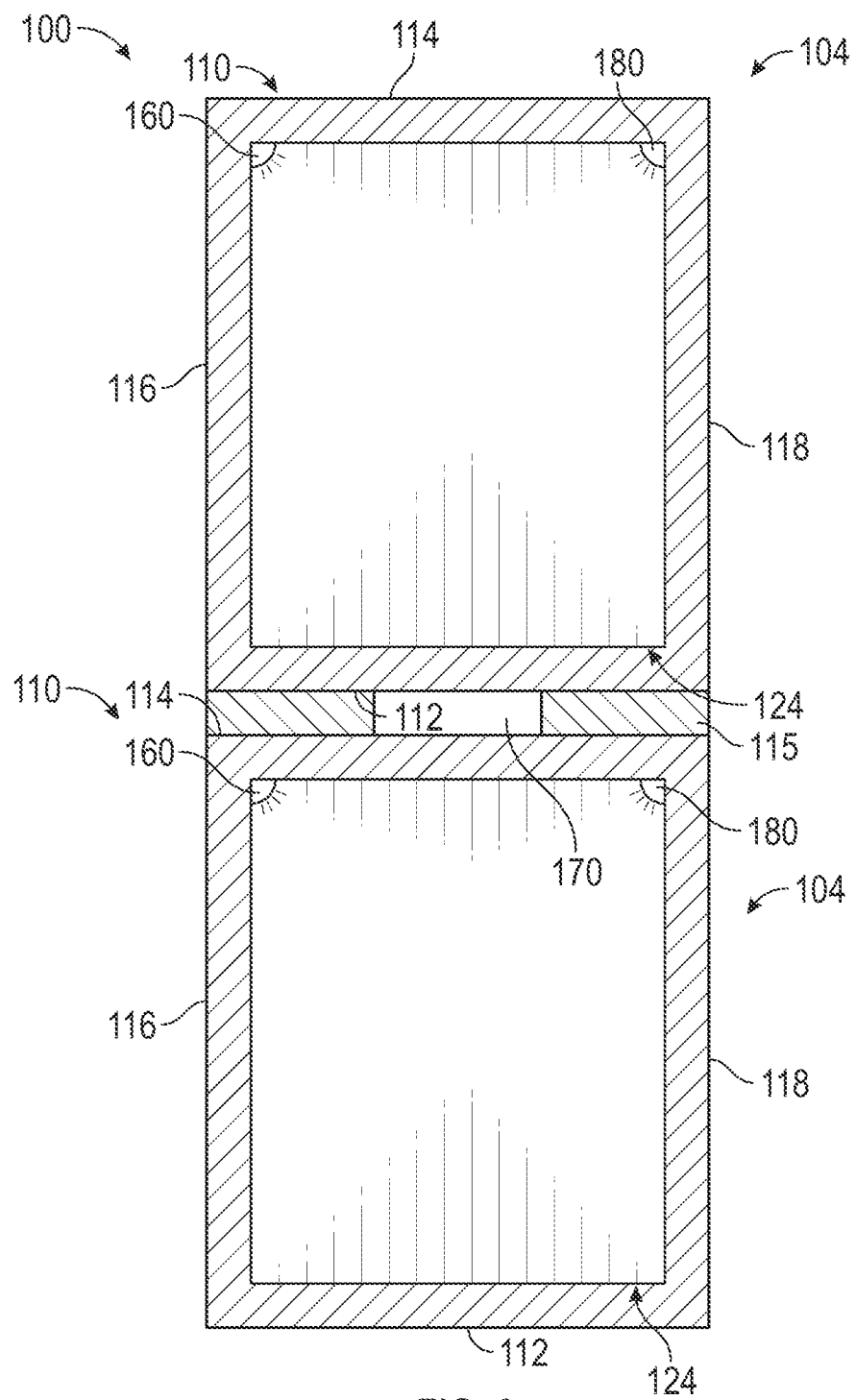
FIG. 6 is a cross-sectional view of a pair of temperature regulating compartments of the cubby unit of FIG. 1 having a common thermal element, according to an exemplary embodiment.
Figure 7:
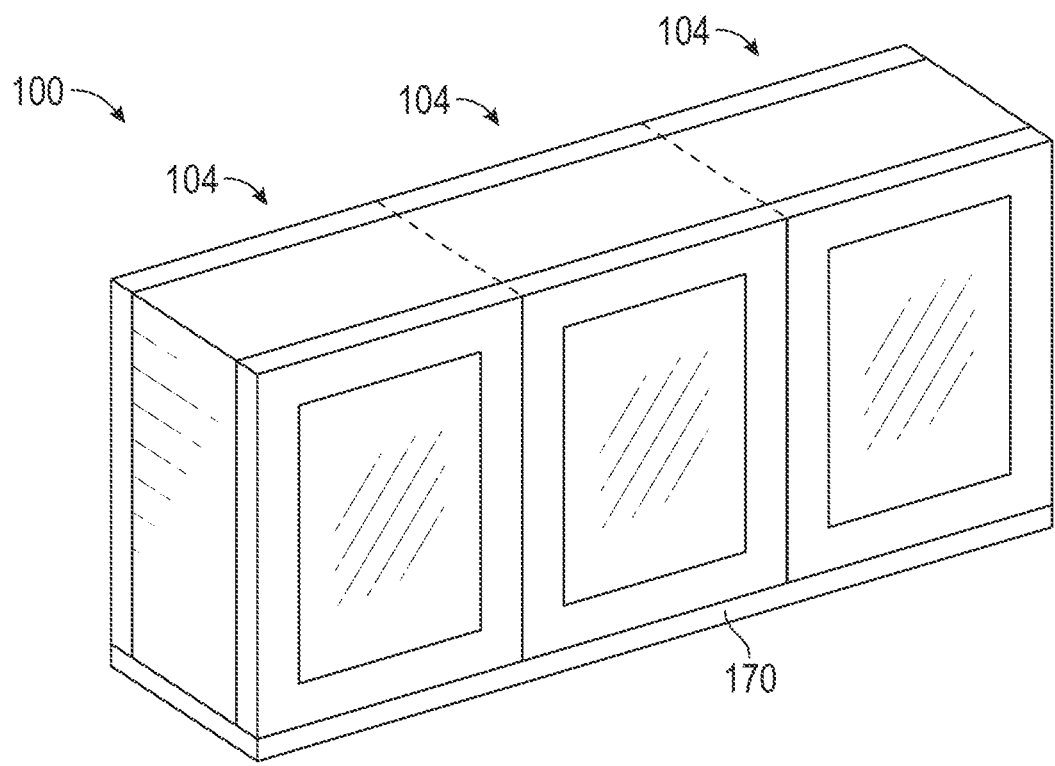
FIG. 7 is a perspective view of a plurality of the compartments of the cubby unit of FIG. 1 having a common thermal element, according to an exemplary embodiment.

Referring now to FIGS. 6 and 7, a second type of the to-go cubbies 100, shown as to-go cubbies 104, is shown. The to-go cubbies 104 may be substantially the same the to-go cubbies 102 as described above with respected to FIGS. 3-5D, except the thermal elements 170 may be shared between adjacent/proximate to-go cubbies 104. As shown in FIG. 6, the thermal elements 170, rather than being positioned within the cubby housings 110 of each of the to-go cubbies 104 (like in the to-go cubbies 102), are positioned within connections, shown as junctions 115, between the cubby housings 110 of adjacent to-go cubbies 104 (e.g., between the bottom wall 112 and top wall 114 of stacked to-go cubbies, between the first sidewall 116 and the second sidewall 118 of adjacent to-go cubbies 104, etc.). Such an arrangement may facilitate (i) heating both of the joined to-go cubbies 104 with the thermal element 170, (ii) cooling the joined to-go cubbies 104 with the thermal element 170, and/or (iii) cooling one of the joined to-go cubbies 104 and heating the other of the joined to-go cubbies 104 with the thermal element 170 (similar to as described above in further detail with respect to the to-go cubby 102 in FIG. 5D).

As shown in FIG. 7, a plurality of the to-go cubbies 104 (e.g., two, three, four, five, etc.) are thermally regulated by a single thermal element or array of commonly controlled thermal elements 170. By way of example, the thermal element 170 may be or include a hot-cold shelf assembly similar to hot-cold shelf assembly disclosed in U.S. Pat. No. 10,288,361. By way of another example, the thermal element 170 may be only a cold shelf or only a hot shelf. By way of yet another example, the thermal element 170 may be or include an induction heating system similar to the induction heating system disclosed in U.S. Pat. Nos. 8,124,200 and 8,968,848. By way of still another example, the thermal element 170 may be or include fluid conduits that receive a hot and/or cold working fluid (e.g., water, air, refrigerant, etc.). In some embodiments, heating elements are positioned along a top or bottom surface of the plurality of to-go cubbies 104 and cooling elements are positioned along the other of the top or bottom surface of the plurality of to-go cubbies 104.

Figure 8:
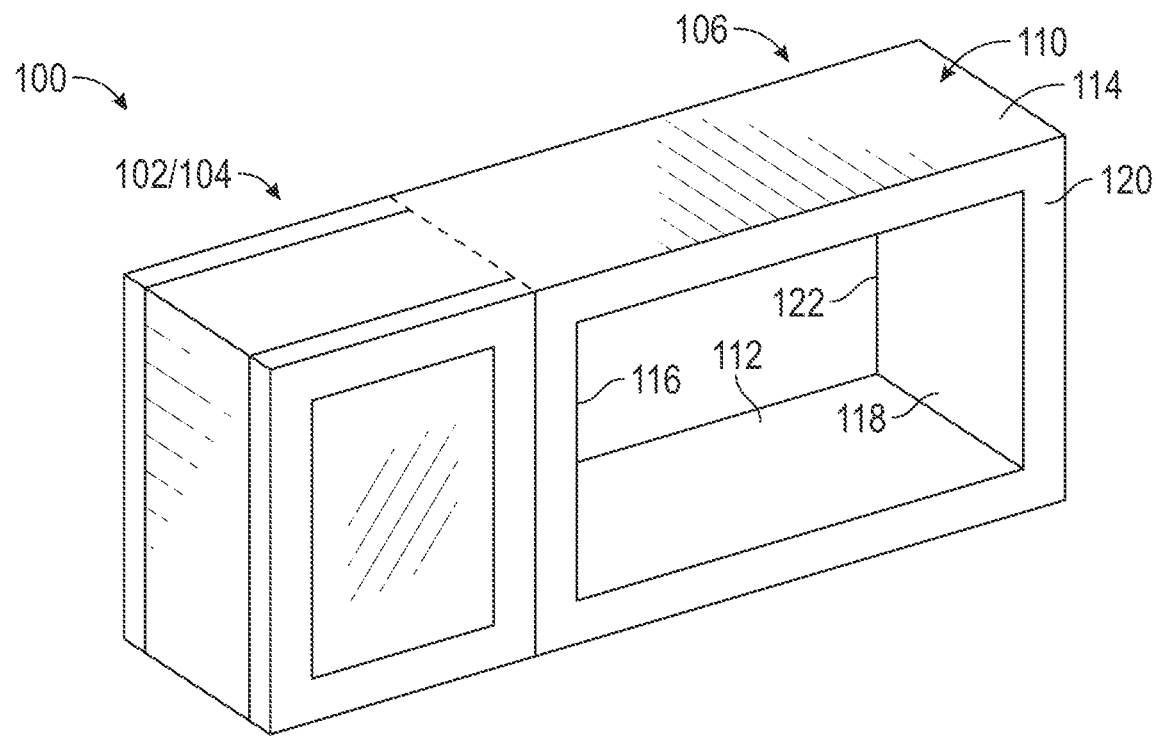
FIG. 8 is a perspective view of different types of the plurality of compartments of the cubby unit of FIG. 1 coupled together, according to an exemplary embodiment.

Referring now to FIG. 8, a third type of the to-go cubbies 100, shown as to-go cubby 106, is shown coupled to a to-go cubby 102 and/or a to-go cubby 104. As shown in FIG. 8, the to-go cubby 106 does not include the customer door 130 or the employee door 140 such that the to-go cubby 106 has an "open, pass-through" design. In some embodiments, the to-go cubby 106 includes a back wall. In some embodiments, the to-go cubby 106 does not include the thermal elements 170 such that the to-go cubby 106 is an open, ambient temperature cubby. Such an open, ambient temperature cubby may be useful for storing utensils (e.g., forks, knives, spoons, etc.), napkins, and/or other goods that do not need to be temperature controlled. In some embodiments, the to-go cubby 106 includes the thermal elements 170. Such thermal elements 170 may be configured to provide an air curtain (e.g., a heated air curtain, a cooled air curtain, etc.) across the opening in the front face 120 and/or the rear face 122 of the cubby housing 110 thereof. By way of example, the thermal element 170 may be similar to the air curtain system disclosed in U.S. Pat. No. 7,220,946, filed Jan. 23, 2004, and U.S. Pat. No. 8,134,101, filed Oct. 11, 2007, both of which are incorporated herein by reference in their entireties.

Figure 9A:
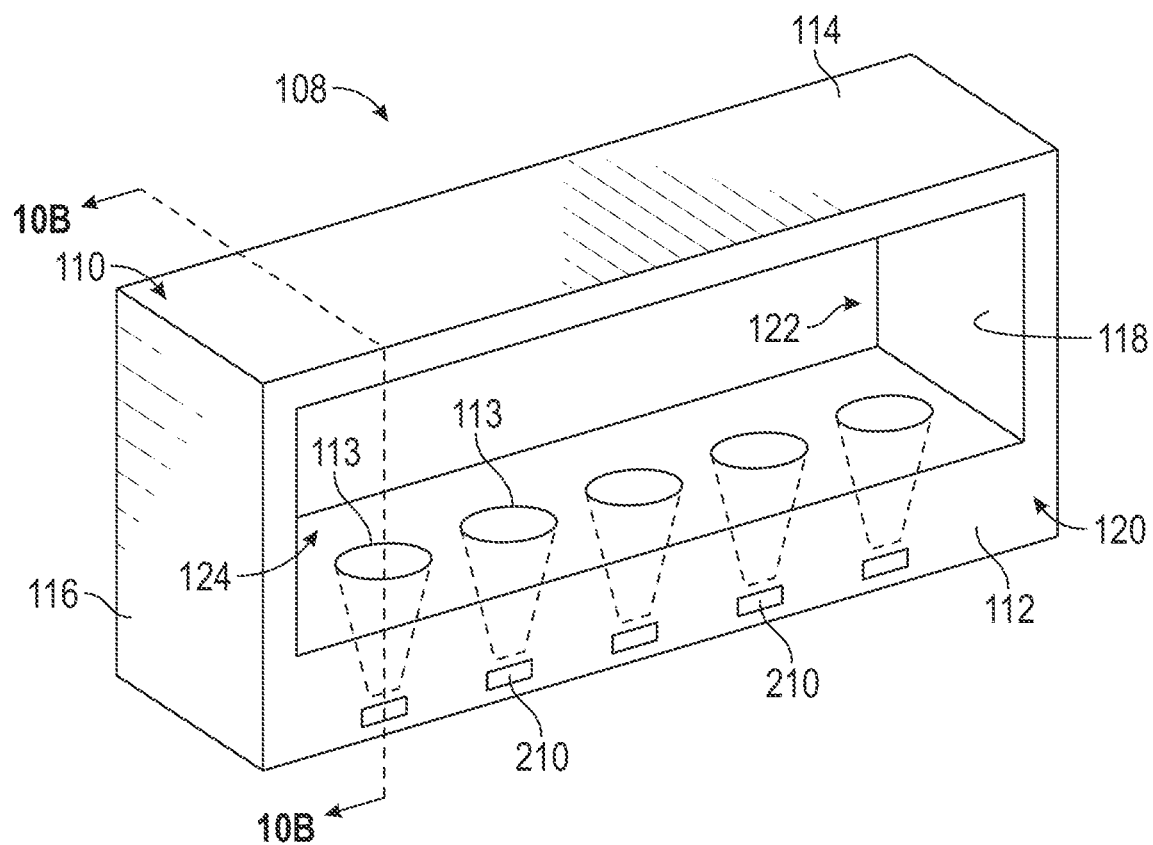
FIGS. 9A and 9B are various views of a beverage compartment of the cubby unit of FIG. 1, according to an exemplary embodiment.
Figure 9B:
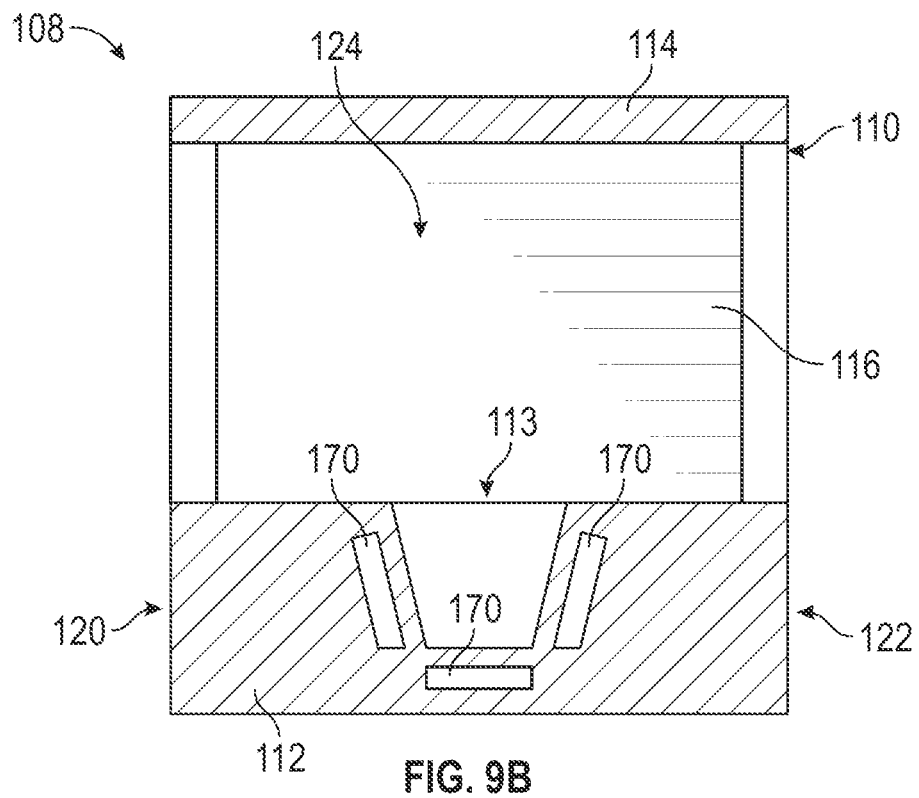

Referring now to FIGS. 9A and 9B, a fourth type of the to-go cubbies 100, shown as to-go cubby 108, is shown. As shown in FIGS. 9A and 9B, the bottom wall 112 of the cubby housing 110 defines a plurality of recesses (e.g., cup holders, bowl holders, soup wells, etc.), shown as temperature regulated holders 113. As shown in FIG. 9B, the thermal elements 170 are positioned to thermally regulate (e.g., heat, cool, etc.) the temperature regulated holders 113. According to an exemplary embodiment, the temperature regulated holders 113 are structured (e.g., shaped, sized, etc.) to receive a liquid container such as a cup or bowl for a warm and/or cold liquid-based food product (e.g., coffee products, soup, stews, teas, iced teas, iced coffees, etc.) to thermally regulate the liquid-based food product stored therein. According to the exemplary embodiment shown in FIGS. 9A and 9B, the to-go cubby 108 does not include the customer door 130 or the employee door 140 such that the to-go cubby 106 has a "pass-through" design. In some embodiments, the to-go cubby 108 includes a back wall. In some embodiments, the to-go cubby 108 includes partitions (e.g., the divider walls 119, etc.) positioned to separate the temperature regulated holders 113 from each other. In some embodiments, the to-go cubby 108 includes a single customer door 130 extending across the entirety of the front face 120 of the cubby housing 110. In some embodiments, each of the temperature regulated holders 113 has an associated customer door 130. In some embodiments, the to-go cubby 108 includes a single employee door 140 extending across the entirety of the rear face 122 of the cubby housing 110. In some embodiments, each of the temperature regulated holders 113 has an associated employee door 140. In some embodiments, the to-go cubby 108 does not include the thermal elements 170 such that the to-go cubby 106 is an open, ambient temperature cubby, but the doors are used for security measures. In embodiments where the to-go cubby 108 is enclosed (e.g., via doors, back walls, etc.), the thermal elements 170 may be configured to thermally regulate the internal compartment 124, in place of or in addition to, thermally regulating the liquid container directly. The contents and/or recipient of the product within the temperature regulated holders 113 may be identified by the displays 210 positioned along the front face 120. Alternatively, instead of including the temperature regulated holders 113, the bottom wall 112 may provide an induction heating shelf including an induction heating system as described in greater detail above.

According to an exemplary embodiment, the bottom wall 112, the top wall 114, the first sidewall 116, the second sidewall 118, and/or the divider wall(s) 119 of the cubby housings 110 of one or more of the various types of the to-go cubbies 100 include insulation to substantially thermally isolate (i) a respective to-go cubby 100 from adjacent to-go cubbies 100 and/or (ii) the first sub-compartment 126 from the second sub-compartment 128 and/or the third sub-compartment 129. The temperature of the internal compartment 124 of one of the to-go cubbies 100 may therefore be controlled and maintained substantially independent of the temperature of the internal compartment 124 of adjacent to-go cubbies 100 and/or the temperature of the first sub-compartment 126 of a respective to-go cubby 100 may therefore be controlled and maintained substantially independent of the temperature of the second sub-compartment 128 and/or the third sub-compartment 129 of the respective to-go cubby 100. In an alternative embodiment, the cubby housings 110 of the to-go cubbies 100 do not include insulation (e.g., all the to-go cubbies 100 of a respective to-go cubby unit 10 are configured for warming, all the to-go cubbies 100 of a respective to-go cubby unit 10 are configured for cooling, all of the to-go cubbies 100 of a respective to-go cubby unit 10 are configured for ambient temperature storage, etc.).

Figure 10:
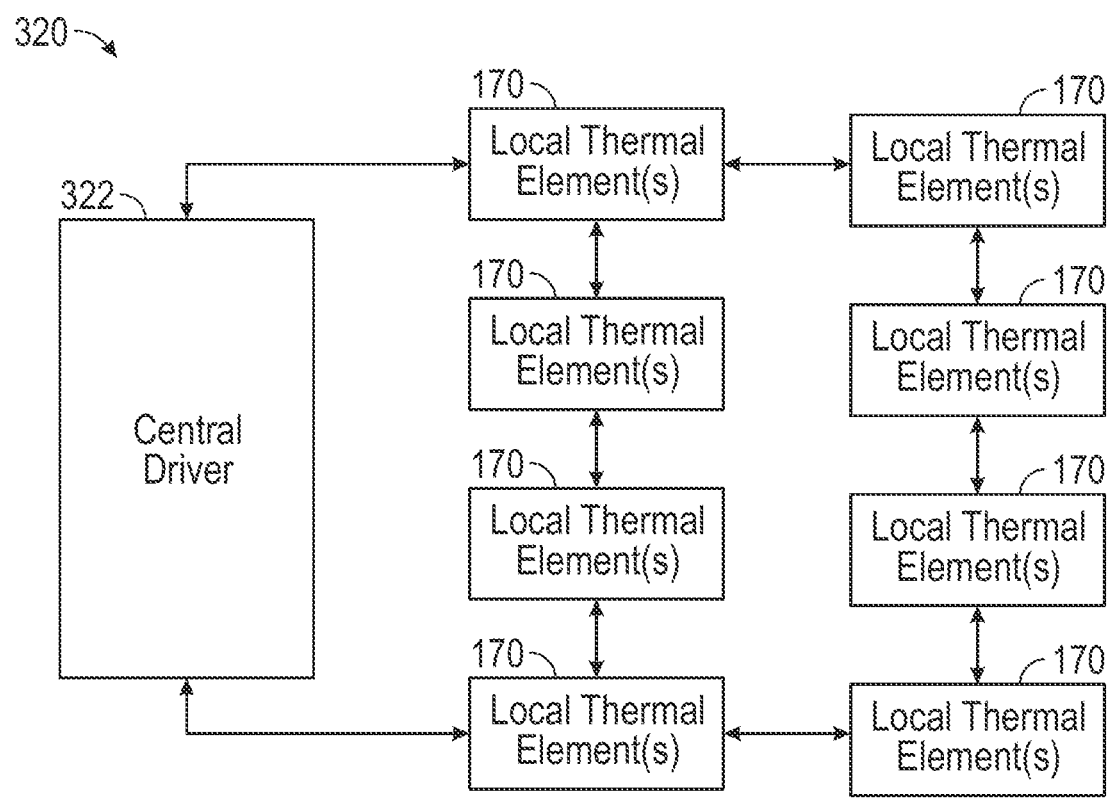
FIG. 10 is a schematic diagram of a centralized thermal management system for the cubby unit of FIG. 1, according to an exemplary embodiment.

As shown in FIGS. 1, 2, 10, and 13, in some embodiments, the to-go cubby unit 10 includes a single temperature management system, shown as centralized thermal management system 320. In other embodiments, each of the to-go cubbies 100, or subsets or grouping of the to-go cubbies 100, includes an independent thermal management system. As shown in FIG. 10, the centralized thermal management system 320 includes a main or common driver, shown as central driver 322, connected to the thermal elements 170 that are positioned locally at each of the to-go cubbies 100 that are temperature controlled. Is some embodiments, the central driver 322 is positioned within a base, side unit/compartment, or other portion of the unit housing 20 adjacent the to-go cubbies 100. In other embodiments, the central driver 322 is positioned external to the unit housing 20.

In one embodiment, the central driver 322 is or includes a condensing unit with refrigerant lines extending therefrom to each of the thermal elements 170 (e.g., cooling coils, etc.) that receive a working fluid (e.g., air, refrigerant, water, etc.) from the condensing unit. In another embodiment, the central driver 322 is or includes an air conditioning unit and/or a heater unit that provides a cool or warm air flow, respectively, that can be provided to each of the thermal element 170. The thermal elements 170 may then direct the thermally regulated air into each of the internal compartments 124 (e.g., the thermal elements 170 may be tubes having air outlets, etc.). In either embodiment, each of the thermal elements 170 may include a flow restrictor or metering device (e.g., a valve, etc.) positioned to facilitate regulating (e.g., throttle, meter, etc.) the flow of the working fluid received from the central driver 322 and, thereby, control a temperature within each of to-go cubbies 100, individually. In still another embodiment, the central driver 322 is an inverter and the thermal elements 170 are induction coils driven by the inverter. Each induction coil may be separately and differentially powered to provide various levels of thermal management (i.e., heating) between the to-go cubbies 100. In some embodiments, the to-go cubby unit 10 includes a combination of the different centralized thermal management systems 320 disclosed herein (e.g., a combination of heating and cooling systems, a combination of different heating systems, etc.). Further, it should be understood that other suitable types of central thermal management systems may be used with the to-go cubby unit 10.

Figure 11B:
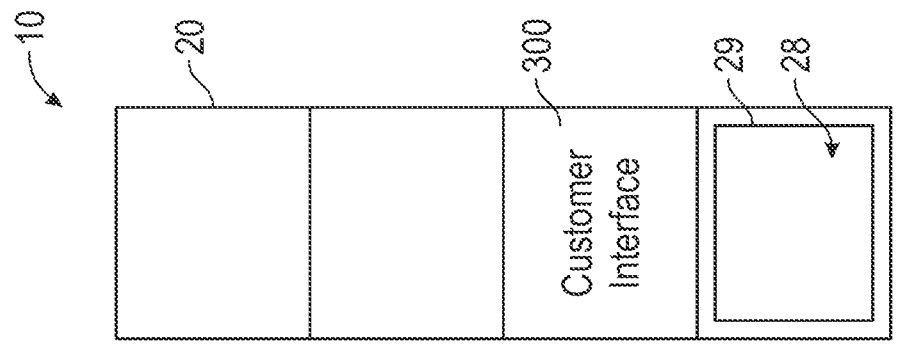
FIGS. 11A-12 are various views of the cubby unit of FIG. 1 having a robotic dispensing system, according to various exemplary embodiments.
Figure 11A:
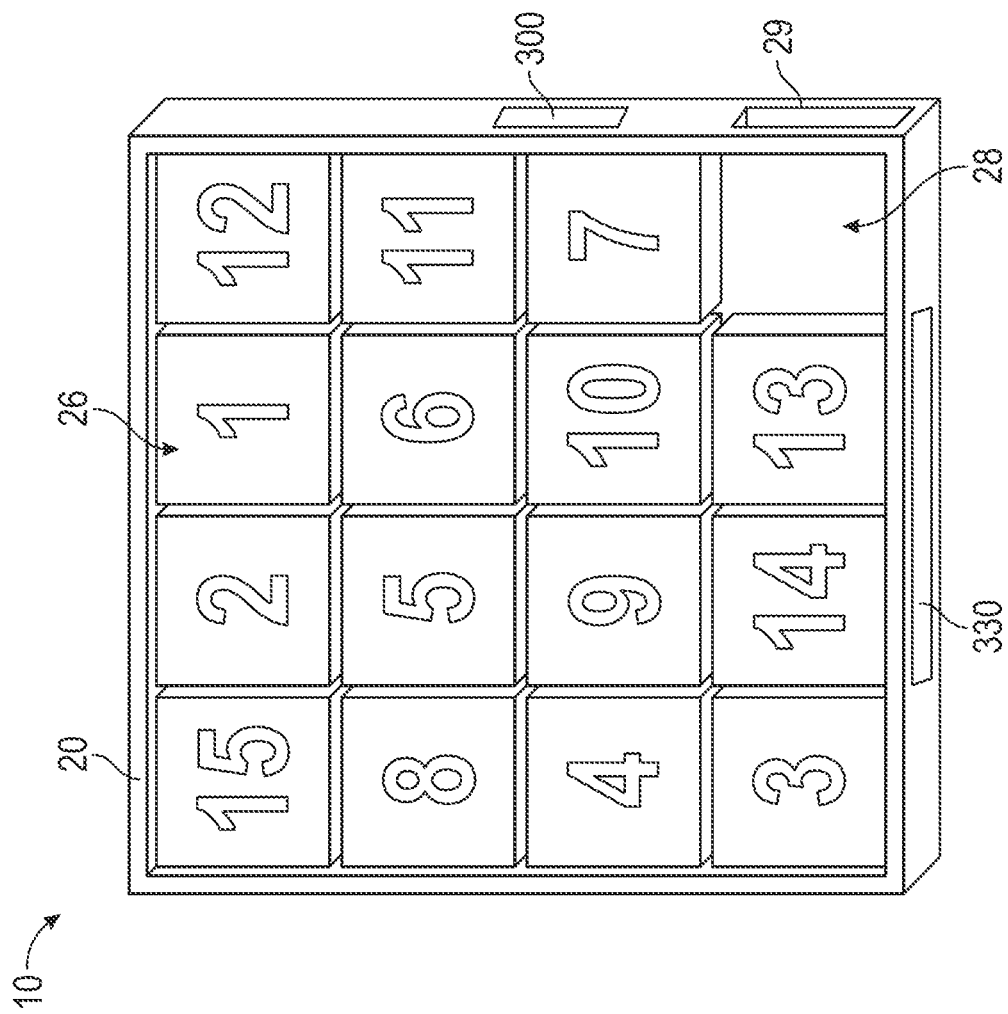

As shown in FIGS. 11A-13, in some embodiments, the to-go cubby unit 10 includes an automated robotic system, shown as dispensing system 330. According to an exemplary, the dispensing system 330 is configured to retrieve and dispense customer orders to a customer upon request (e.g., a customer accessing the to-go cubby unit 10 via the customer interface 300, etc.). As shown in FIGS. 11A and 11B, the unit housing 20 of the to-go cubby unit 10 defines a first, interior chamber, shown as order storage chamber 26, and a second, outlet chamber, shown as order dispensing chamber 28. The order storage chamber 26 is configured to receive a plurality of customer orders (e.g., loaded by an employee, etc.). The order storage chamber 26 may be thermally regulated (e.g., heated, cooled, etc.) or an ambient temperature compartment. As shown in FIGS. 11A and 11B, the unit housing 20 defines an aperture, shown as outlet 29, that facilitates accessing an order provided to the order dispensing chamber 28 from the order storage chamber 26. In some embodiments, the to-go cubby unit 10 include a openable door that selectively encloses the outlet 29.

According to an exemplary embodiment, the dispensing system 330 is configured to receive an order retrieval request associated with a respective customer order (e.g., from the customer interface 300, from the employee interface 310, from a customer's personal device, etc.; subject to the approval/credential processes described herein; etc.) and retrieve the respective customer order from within the order storage chamber 26 and provide the respective customer order to the order dispensing chamber 28. The customer may then remove their order from the order dispensing chamber 28 though the outlet 29. The dispensing system 330 may include various motors, arms, slides, grabbers, etc. to move (i) from a nominal position to a respective order position to grab or otherwise secure the respective order and (ii) from the respective order position to a dispensing position at the order dispensing chamber 28 to provide the respective order to the order dispensing chamber 28 for customer pickup/retrieval. Alternatively, the dispensing system 330 may be or include a carousel that cycles along a predetermined track or path until the respective order aligns with the order dispensing chamber 28.

Figure 12:
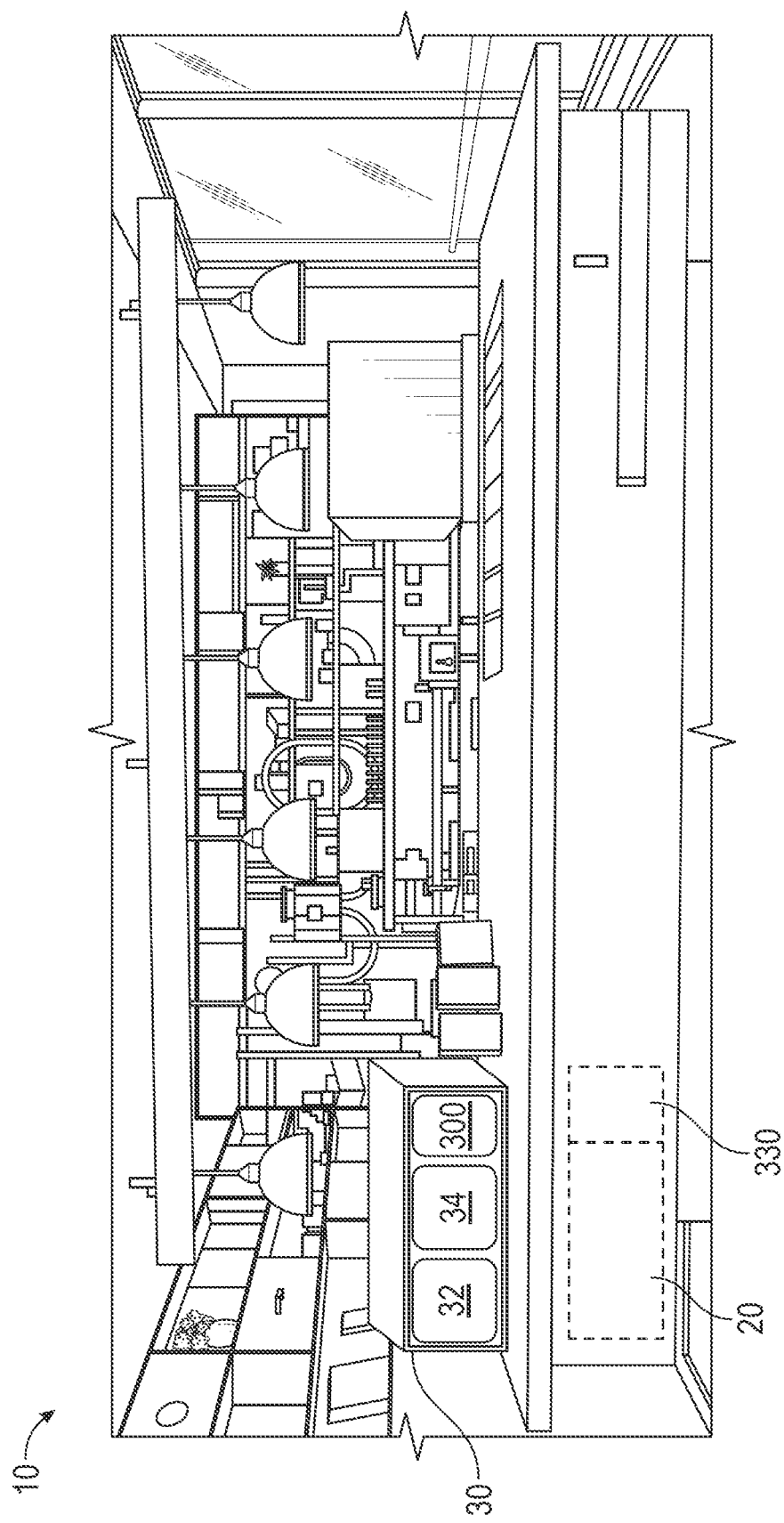

As shown in FIG. 12, the to-go cubby unit 10 has a two-part design with the unit housing 20 separate from a second housing, shown as dispensing housing 30. The unit housing 20 may therefore be positioned under a counter or otherwise hidden (and, therefore, the customer order is hidden) and only the dispensing housing 30 may need to be visible or on top of the counter. As shown in FIG. 12, the dispensing housing 30 include a plurality of dispensing chambers, shown as first dispensing chamber 32 and second dispensing chamber 34, and the customer interface 300. In other embodiments, the dispensing housing 30 includes a single dispensing chamber or three or more dispensing chambers. The dispensing system 330 may include various motors, arms, slides, grabbers, etc. to move (i) from a nominal position to a respective order position to grab or otherwise secure the respective order and (ii) from the respective order position to a dispensing position at the first dispensing chamber 32 and/or the second dispensing chamber 34 to provide the respective order for customer pickup/retrieval. In one embodiment, the dispensing system 330 is configured to move the respective order from the unit housing 20, through the counter, and into one of the first dispensing chamber 32 or the second dispensing chamber 34 of the dispensing housing 30 (e.g., like an elevator, etc.). In another embodiment, the dispensing system 330 is configured to remove the respective order from the unit housing 20, move the order around the counter (e.g., rearward of the counter, to the side of the counter, etc.), and then insert the respective order into one of the first dispensing chamber 32 or the second dispensing chamber 34 of the dispensing housing 30 (e.g., through a side of the dispensing housing 30 opposite the customer, etc.).

In some embodiments, the to-go cubbies 100 are selectively detachable from one another such that the to-go cubby unit 10 is modular (e.g., individual to-go cubbies 100 may be selectively added or removed from the to-go cubby unit 10, etc.). As shown in FIGS. 3 and 13, in some embodiments, each of the to-go cubbies 100 (e.g., the to-go cubbies 102, the to-go cubbies 104, the to-go cubbies 106, the to-go cubbies 108, etc.) include one or more connectors (e.g., quick-connect connectors, etc.), shown as connectors 190, disposed along the bottom wall 112, the top wall 114, the first sidewall 116, and/or the second sidewall 118. In some embodiments (e.g., embodiments where the to-go cubbies 100 do not include the employee doors 140, etc.), a connector 190 is additionally or alternatively disposed along the rear face 122 of the to-go cubby 100. According to the exemplary embodiment shown in FIG. 13, the connectors 190 include (i) a first type of connector, shown as mechanical connector 192, configured to facilitate selectively, mechanically coupling (a) a respective to-go cubby 100 to one or more other adjacent to-go cubbies 100 and/or (b) the respective to-go cubby 100 directly to the unit housing 20; (ii) a second type of connector, shown as electrical connector 194, configured to facilitate selectively, electrically coupling (a) the respective to-go cubby 100 to one or more other to-go cubbies 100 (e.g., a first to-go cubby 100 coupled to the bottom wall 112 of the respective to-go cubby 100, a second to-go cubby 100 coupled to the top wall 114 of the respective to-go cubby 100, a third to-go cubby 100 coupled to the first sidewall 116 of the respective to-go cubby 100, a fourth to-go cubby 100 coupled to the second sidewall 118 of the respective to-go cubby 100, and/or a fifth to-go cubby 100 coupled to the rear face 122 of the respective to-go cubby 100; a daisy-chained coupling; etc.) and/or (b) the respective to-go cubby 100 directly to a power source (e.g., the unit power source 340, etc.) of the to-go cubby unit 10; (iii) a third type of connector, shown as data connector 196, configured to facilitate transmitting data (a) between the respective to-go cubby 100 to one or more other to-go cubbies 100 until the data is provided to the control unit 400 of the to-go cubby unit 10 and/or (b) from the respective to-go cubby 100 directly to the control unit 400 of the to-go cubby unit 10; and/or (iv) a fourth type of connector, shown as thermal connector 198, configured to facilitate selectively connecting (a) the thermal elements 170 of the respective to-go cubby 100 to the thermal elements 170 one or more other to-go cubbies 100 that ultimately connect to the central driver 332 or (ii) the thermal elements 170 of the respective to-go cubby 100 directly to the central driver 332.

In some embodiments, the to-go cubby unit 10 having a modular construction may continue to be operational while one or more of the to-go cubbies 100 are detached therefrom. In some embodiments, as shown in FIGS. 3 and 13, the to-go cubbies 100 include a communications interface, shown as wireless transceiver 220, configured to facilitate wireless data communication between the to-go cubbies 100 and the control unit 400 of the to-go cubby unit 10 or other external devices (e.g., customer devices, company devices, a server, etc.). In other embodiments, data communication is achieved through direct wired connections or through the data connectors 196. In embodiments where the to-go cubby unit 10 is modular, the to-go cubbies 100 may include an individual controller that performs at least some of the operations disclosed herein regarding the control unit 400. In some embodiments, each to-go cubby 100 has a respective address and, when the to-go cubbies 100 are connected together, the to-go cubbies 100 may form a daisy-chained, serial communication/data bus that is selectively expandable by adding or removing to-go cubbies 100 from the to-go cubby unit 10. Accordingly, each respective to-go cubby 100 may still be independently controlled based on the address being known by the control unit 400 when connected to the daisy-chained, serial communication/data bus.

In some embodiments, as shown in FIGS. 3 and 13, the to-go cubby unit 10 includes a first power source, shown a unit power source 340, and/or the to-go cubbies 100 include a second power source, shown as cubby power source 200. The unit power source 340 may be configured to power the to-go cubbies 100 (e.g., via wired connections, via the electrical connectors 194, etc.), the customer interface 300, the employee interface 310, the centralized thermal management system 320, and/or the dispensing system 330. In one embodiment, the unit power source 340 is an electrical connector (e.g., a power cord, etc.) that facilitates connecting the to-go cubby unit 10 to a mains power source (e.g., an electrical grid via an electrical outlet, etc.). In some embodiments, the unit power source 340 additionally or alternatively includes an on-board power storage and/or supply device (e.g., a battery, a solar panel, a solar generator, a combustion generator, etc.) that facilitates generating, storing, and/or providing power to electrical components of the to-go cubby unit 10 to facilitate operation of the to-go cubby unit 10 when not near an external power source (e.g., the to-go cubby unit 10 may therefore be a mobile unit, etc.). The cubby power source 200 may be configured to store energy to facilitate powering electrical components of a to-go cubby 100 (e.g., locking mechanism 150, lighting elements 160, thermal elements 170, sensors 180, display 210, wireless transceiver 220, etc.) independent of or in addition to the unit power source 340. The unit power source 340 and/or the cubby power source 200 may be rechargeable and/or interchangeable. In embodiments where the to-go cubbies 100 are modular and include the cubby power source 200, the to-go cubbies 100 may be operational when detached from the to-go cubby unit 10.

In some embodiments, the to-go cubbies 100 do not include the thermal elements 170, but rather the to-go cubbies 100 include a battery powered heater than can be selectively positioned within the internal compartment 124 of the to-go cubbies 100. Each battery powered heater may be individually placed within the to-go cubbies 100 and set as desired to thermally regulate a temperature with a respective to-go cubby 100.

As shown in FIG. 13, a point of sale ("POS") system, shown as POS system 500, includes the to-go cubby unit 10, one or more devices external to the to-go cubby unit 10, shown as company devices 430, and a remote server, shown as server 440. According to an exemplary embodiment, the POS system 500 is configured to receive and manage orders received from customers.

As shown in FIG. 13, the control unit 400 of the to-go cubby unit 10 includes a control device, shown as controller 410, and a communication device (e.g., receiver, transmitter, transceiver, etc.), shown as communications interface 420. In one embodiment, the control unit 400 is configured to selectively engage, selectively disengage, control, and/or otherwise communicate with the other components of the to-go cubby unit 10 and external devices/systems. As shown in FIG. 13, the communications interface 420 is configured to couple the controller 410 to the other components of the to-go cubby unit 10 (e.g., the to-go cubbies 100, the customer interface 300, the employee interface 310, the centralized thermal management system 320, the dispensing system 330, etc.), the company devices 430, the server 440, and one or more second external devices, shown as customer devices 450. In other embodiments, the controller 410 is coupled to more or fewer components. By way of example, the controller 410 may send signals to and receive signals from the components of the to-go cubbies 100 (e.g., the locking mechanisms 150, the lighting elements 160, the thermal elements 170, the sensors 180, the displays 210, the wireless transceivers 220, etc.), the customer interface 300, the employee interface 310, the centralized thermal management system 320, the dispensing system 330, the company devices 430, the server 440, and/or the customer devices 450 via the communications interface 420. The communications interface 420 may utilize various wired communication protocols, short-range wireless communication protocols (e.g., Bluetooth, near field communication ("NFC"), RFID, ZigBee, Wi-Fi, etc.), and/or long-range wireless communication protocols (e.g., cellular, Internet, radio, etc.) to facilitate communication with the various devices.

The controller 410 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 6, the controller 410 includes a processing circuit 412 and a memory 414. The processing circuit 412 may include an ASIC, one or more FPGAs, a DSP, circuits containing one or more processing components, circuitry for supporting a microprocessor, a group of processing components, or other suitable electronic processing components. In some embodiments, the processing circuit 412 is configured to execute computer code stored in the memory 414 to facilitate the activities described herein. The memory 414 may be any volatile or non-volatile computer-readable storage medium capable of storing data or computer code relating to the activities described herein. According to an exemplary embodiment, the memory 414 includes computer code modules (e.g., executable code, object code, source code, script code, machine code, etc.) configured for execution by the processing circuit 412.

According to an exemplary embodiment, the customer interface 300 facilitates communication between a customer and the to-go cubby unit 10. The customer interface 300 may be or include a display screen, a touch screen, a keypad, a number pad, a scanner device, a biometric scanner, a tablet, a computer, and/or other suitable components. By way of example, the customer may use the customer interface 300 to place an order and/or to pick up an order. For example, the customer may enter an order number, a customer PIN, a customer name, phone number, a credential, a biometric (e.g., a fingerprint, a facial scan, etc.), etc. into the customer interface 300 associated with their food order to provide an indication that the customer is present to retrieve their food order. As another example, the customer may present their personal customer device 450 having a barcode, QR code, or other identifier displayed thereon that is associated with their food order to the customer interface 300 (e.g., a scanner device, etc.) to provide an indication that the customer is present to retrieve their food order.

According to an exemplary embodiment, the employee interface 310 facilitates communication between an operator (e.g., employee, cook, chef, staff member, etc.) of the to-go cubby unit 10 and one or more components of the to-go cubbies 100 thereof (e.g., the locking mechanisms 150, the lighting elements 160, the thermal elements 170, the sensors 180, the displays 210, etc.) of the to-go cubby unit 10. The employee interface 310 may be or include a display screen, a touch screen, a keypad, a number pad, a tablet, a computer, and/or other suitable components. By way of example, an employee may use the employee interface 310 to select a respective to-go cubby 100 for a food order; provide an indication that the food order has been placed in the respective to-go cubby 100; unlock the employee door 140 associated with the respective to-go food cubby 100; unlock the customer door 130 associated with the respective to-go cubby 100; set a temperature within the internal compartment 124, the first sub-compartment 126, and/or the second sub-compartment 128 of the respective to-go cubby 100; and/or still perform other functions.

According to an exemplary embodiment, the customer devices 450 facilitate communication between customers and the to-go cubby unit 10 and/or the server 440. The customer devices 450 may be stationary devices (e.g., desktop computers, etc.) and/or portable devices (e.g., smartphones, laptops, tablets, smartwatches, etc.). By way of example, a customer may use their personal customer device 450 to place a food order through an Internet website or mobile application associated with the company that owns of the to-go cubby unit 10. The order may then be transmitted from the customer device 450 to the server 440 (e.g., via the Internet, etc.). By way of another example, a customer may use their personal customer device 450 to place a food order with an employee by telephone. The telephone order may then be entered into the system by the employee using the company devices 430 (e.g., a register, etc.). Alternatively, the customer devices 450 may be used by customers to place a food order directly to the to-go cubby unit 10 while in short-range communication with the to-go cubby unit 10. The customer devices 450 may also be configured to receive a notification (e.g., a text, an email, a mobile application notification, etc.) regarding a placed order, a completed order, which respective to-go cubby 100 the completed order is or will be in, and/or credentials to access the completed order from the respective to-go cubby 100 upon arrival (e.g., an order number, a PIN, a barcode, a QR code, a mobile credential, etc.) from the server 440 and/or the to-go cubby unit 10. In some embodiments, the customer devices 450 supplement or replace the customer interface 300. By way of example, the customer devices 450 may connect to the to-go cubby unit 10 once within short-range wireless communication and notify the to-go cubby unit 10 regarding the arrival of customers. By way of another example, the customer devices 450 may facilitate a customer with entering an order number, a customer PIN, a customer name, phone number, a biometric, the credential, etc. into their personal customer device 450 associated with their food order to provide an indication that the customer is present to retrieve their food order, which may then be transmitted to the server 440 and/or the to-go cubby unit 10 by the customer device 450. By way of yet another example, the customer devices 450 may transmit the credential to the to-go cubby unit 10 (e.g., once a short-range wireless connection is formed therebetween, etc.).

According to an exemplary embodiment, the company devices 430 facilitate communication between employees and the server 440 and/or the to-go cubby unit 10. The company devices 430 may be stationary devices (e.g., desktop computers, registers, etc.) and/or portable devices (e.g., smartphones, laptops, tablets, etc.). By way of example, placed orders (e.g., made via the company devices 430 such as a register, made via the customer devices 450 to the server 440, made by the customer devices 450 to the to-go cubby unit 10, made by customers via the customer interface 300, etc.) may be provided to the company devices 430 to inform the employees to prepare the food order. The company devices 430 may also notify the employees which to-go cubby 100 to place the food order upon completion. In some embodiments, the company devices 430 supplement or replace the employee interface 310. By way of example, the company devices 430 may connect to the to-go cubby unit 10 (e.g., via wireless or wired communication protocols) and allow an employee to select a respective to-go cubby 100 for a food order; provide an indication that the food order has been placed in the respective to-go cubby 100; unlock the employee door 140 associated with the respective to-go food cubby 100; unlock the customer door 130 associated with the respective to-go cubby 100; set a temperature within the internal compartment 124, the first sub-compartment 126, and/or the second sub-compartment 128 of the respective to-go cubby 100; and/or still perform other functions.

In some embodiments, the controller 410 is configured to receive an indication of a new order placed by a customer. In such embodiments, the controller 410 may identify a suitable to-go cubby 100 to accommodate the new order (e.g., based on food contents, size, time, currently occupied to-go cubbies 100, etc.), which may then be relayed to the customer (e.g., via their personal customer device 450, directly with the communications interface 420 using long-range wireless communication, indirectly through the server 440, etc.) and/or the employees (e.g., via the employee interface 310, the company devices 430, etc.). In other embodiments, the server 440 and/or the company devices 430 make such identification, which may then be relayed to the customer (e.g., via their personal customer device 450, etc.), the controller 410, and/or to the employees (e.g., via the employee interface 310, the company devices 430, etc.). In still other embodiments, the employee makes this determination on their own. In such embodiments, the employee may notify the to-go cubby unit 10 via the employee interface 310 and/or the company devices 430 which to-go cubby 100 the order will or has been placed in, which may be relayed to the customer (e.g., e.g., via their personal customer device 450, directly with the communications interface 420 using long-range wireless communication, indirectly through the server 440, etc.). Alternatively, as described in more detail herein, the controller 410 may be configured to detect which order has been placed in a to-go cubby 100 and provide a notification to the associated customer device 450 either directly (e.g., through long-range wireless communication, etc.) or indirectly through the server 440. The controller 410 may transmit a notification to the associated customer device 450 in response to the order being placed within the to-go cubby assigned to the order (e.g., based on detection, based on input from an employee, etc.).

According to an exemplary embodiment, the controller 410 is configured to activate the lighting elements 160 of a respective to-go cubby 100. In one embodiment, the controller 410 is configured to activate the lighting elements 160 of a respective to-go cubby 100 to indicate which to-go cubby 100 the employee should place an order. In some embodiments, the controller 410 is configured to activate the lighting elements 160 of a respective to-go cubby 100 in response to the employee door 140 thereof being opened. In some embodiments, the controller 410 is configured to activate the lighting elements 160 of a respective to-go cubby 100 in response to the customer door 130 thereof being opened. In some embodiments, the controller 410 is configured to activate the lighting elements of a respective to-go cubby 100 to indicate which to-go cubby 100 a customer should access to retrieve their order (e.g., after providing an appropriate identifier, credential, etc.).

According to an exemplary embodiment, the controller 410 is configured to control the thermal elements 170 and/or the central driver 322 (e.g., the thermal elements 170 directly and individually, the central driver 322 individually, the valve/metering device of the thermal element 170 and the central driver 322, etc.) to hold a to-go cubby 100 at an appropriate temperature to maintain the order placed in the to-go cubby 100 at a desired temperature until picked up by the customer or otherwise removed. In one embodiment, the appropriate temperature is set by an employee using the employee interface 310 and/or the company devices 430. In other embodiments, the controller 410 and/or the server 440 are configured to determine the appropriate temperature based on the type of food product in the order placed into the to-go cubby 100. In one embodiment, the information regarding the food product in the order is provided to the controller 410 by the server 440. In another embodiment, the information regarding the food product in the order is provided to the controller 410 by the employee using the employee interface 310 and/or the company devices 430. In other embodiments, the controller 410 is configured to determine the food product in the order via data gathered by the sensors 180 (e.g., the optical sensor, the RFID sensor, etc.). By way of example, the controller 410 may receive data from the optical sensor and/or the RFID reader regarding an identifier (e.g., a barcode, a QR code, an ID number, an order number, RFID tag, etc.) on the container of the food product and determine what the appropriate temperature for the food product is based on the identifier. By way of another example, the controller 410 may receive data from the optical sensor regarding the size, the shape, the color, the texture, and/or other identifying characteristics of the container storing the food product and/or the food product itself to determine the type of food product and determine what the appropriate temperature for the food product is based on optical recognition.

According to an exemplary embodiment, the controller 410 is configured to receive data from the sensors 180 regarding the actual temperature within a to-go cubby 100 and control the thermal elements 170 and/or the central driver 322 to bring the actual temperature to the appropriate or set temperature and maintain the temperature at the appropriate or set temperature. In some embodiments, the controller 410 is configured to activate the thermal elements 170 in response to detecting via the sensors 180 (e.g., motion sensor, occupancy sensor, weight sensor, etc.) that the food product is present within a to-go cubby 100 and/or deactivate the thermal elements 170 in response to detecting via the sensors 180 that the food product within the to-go cubby 100 has been removed (e.g., by supply power or removing power therefrom, by opening or closing the valve thereof, etc.). In some embodiments, the controller 410 is configured to deactivate the thermal elements 170 after a threshold period of time (e.g., ten minutes, fifteen minutes, thirty minutes, etc.).

According to an exemplary embodiment, the controller 410 is configured to selectively provide an identification of which to-go cubby 100 holds a customer's order and/or selectively unlock the to-go cubby 100 holding the customer's order based on the customer or the customer device 450 of the customer providing a credential (e.g., a PIN or code, an order number, a customer name, a phone number, a biometric identifier, a barcode, a QR code, a mobile credential, etc.) that is associated with the order to the controller 410. By way of example, the controller 410 may provide an indication of which to-go cubby 100 holds the customer's order on the customer interface 300. By way of another example, the controller 410 may additionally or alternatively activate or flash the lighting elements 160 of the to-go cubby 100 holding the customer's order. By way of yet another example, the controller 410 may additionally or alternatively provide an indication of which to-go cubby 100 holds the customer's order to the customer device 450 of the respective customer (e.g., directly, indirectly through the server 440, etc.). By way of still another example, the controller 410 may activate the display 210 (e.g., with the customer's name, with some sort of indication, on the customer door 130, etc.) of the to-go cubby 100 that is holding the customer's order. By way of still yet another example, the controller 410 may activate an audible indication (e.g., a beep at the to-go cubby 100 holding the customer's order, a cubby number audible output, etc.) to indicate which to-go cubby is holding the customer's order.

In embodiments where the to-go cubbies 100 include the locking mechanisms 150, the controller 410 is configured to disengage the locking mechanism 150 to unlock a customer door 130 of the to-go cubby 100 holding an order that is associated with a credential received by the to-go cubby unit 10. In some embodiments, the controller 410 is configured to activate an actuator (e.g., a motor, a linear actuator, etc.) positioned to automatically open and close the customer door 130 of the to-go cubby 100. In some embodiments, the controller 410 is configured to receive an open command from the customer device 450 of the customer trying to pick up their order (e.g., via a mobile application on the customer device 450, etc.). In such an embodiment, the controller 410 may only unlock the locking mechanism 150 and/or activate the actuator if the customer device 450 is detected within short-range communication of the to-go cubby unit 10. In some embodiments, the controller 410 is configured to detect the customer device 450 of the customer when in short-range communication and perform a verification process (e.g., receive a mobile credential from the customer device 450, etc.) without requiring the customer to manually provide a credential to the to-go cubby unit 10 or operate the customer device 450 to provide the credential. In such embodiments, the customer door 130 associated with the to-go cubby 100 holding the customer's order may be automatically unlocked, opened (e.g., using the actuator, etc.), and/or identified (e.g., by activating the lighting elements 160, activating the display 210, audible indication, etc.).

In embodiments where the to-go cubbies 100 include the dispensing system 330, the controller 410 is configured to control operation of the dispensing system 330 to retrieve an order that is associated with a credential/identifier received by the to-go cubby unit 10. In some embodiments, the controller 410 is configured to receive the credential/identifier based on an input received at the customer interface 300. In some embodiments, the controller 410 is configured to receive the credential/identifier from the customer device 450 (e.g., scanned from a display thereof, received through short-range communication, using a mobile application, etc.).

In such an embodiment, the controller 410 may only operate the dispensing system 330 to dispense the customer's order if the customer device 450 is detected within short-range communication of the to-go cubby unit 10. In some embodiments, the controller 410 is configured to detect the customer device 450 of the customer when in short-range communication and perform a verification process (e.g., receive a mobile credential from the customer device 450, etc.) without requiring the customer to manually provide a credential to the to-go cubby unit 10 or operate the customer device 450 to provide the credential. In such embodiments, the dispensing system 330 may be automatically operated based on such detection and verification.

Referring now to FIGS. 14-16, various graphical user interfaces ("GUIs") provided by the employee interface 310 are shown that facilitate an employee with selecting and classifying a respective to-go cubby 100 for an order. As shown in FIG. 14, a first GUI, shown as cubby selection GUI 312, provides an employee with information to identify which of the to-go cubbies 100 are currently occupied and which are empty. The employee may select a to-go cubby 100 not in use, which directs the employee to a second GUI, shown as classification GUI 314 in FIG. 15. The classification GUI 314 facilitates the employee in classifying the selected to-go cubby 100 for the order (e.g., by entering the customer's name, order number, etc.). As shown in FIG. 16, a third GUI, shown as instruction GUI 316, is presented to the employee instructing them to place the order in the selected to-go cubby 100. The various GUIs may also designate the amount of time each order has been within its respective to-go cubby 100.

Figure 17:
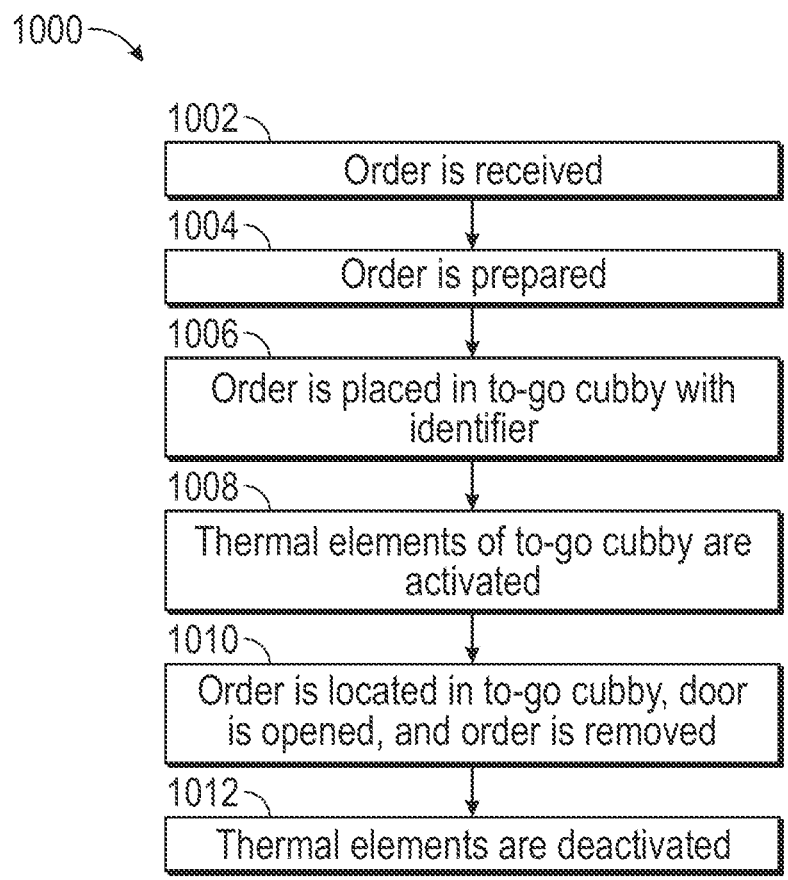
FIG. 17 is a method for receiving an order from a customer and providing the order to the customer via a cubby unit, according to an exemplary embodiment.

Referring now to FIG. 17, a method 1000 for receiving an order from a customer and providing the order to the customer via a to-go cubby unit is shown, according to an exemplary embodiment. At step 1002, an order is received from a customer. By way of example, the order may be made by the customer through a mobile application (e.g., a restaurant ordering application, etc.), a website (e.g., a restaurant website, et.), a phone order, at a register within a restaurant, directly at a to-go cubby unit (e.g., the to-go cubby unit 10, etc.), etc. The order may be entered into a POS system (e.g., the POS system 500, via the server 440, via the company devices 430, via the to-go cubby unit 10, etc.). At step 1004, employees are notified of the order (e.g., on the company devices 430, etc.) and the order is prepared.

At step 1006, the order is placed in a to-go cubby (e.g., the to-go cubby 100, through the employee door 140 thereof, through the customer door 130 thereof, through an opening in the to-go cubby unit, etc.) of the to-go cubby unit with an identifier (e.g., a receipt, etc.) that indicates the customer associated with the order. At step 1008, thermal elements (e.g., the thermal elements 170, etc.) of the to-go cubby are activated. In one embodiment, the thermal elements are manually activated by the employee and the temperature is manually set by the employee (e.g., via a thermostat for the to-go cubby 100, via the employee interface 310, via the company devices 430, etc.). In another embodiment, the thermal elements are automatically activated and the temperature is automatically set by a control unit (e.g., the control unit 400, the controller 410, etc.) of the to-go cubby unit (e.g., based on optical recognition, based on an identifier read on the order, based on a RFID tag read on the order, based on the order details, etc.).

At step 1010, the order is located in the to-go cubby, a door (e.g., the customer door 130, etc.) of the to-go cubby is opened (if the to-go cubby includes the door), and the order is removed by the customer. At step 1012, the thermal elements are deactivated. In one embodiment, the thermal elements are manually deactivated by an employee. In another embodiment, the thermal elements are automatically deactivated by the control unit after a set time period. In other embodiments, the thermal elements are automatically deactivated by the control unit in response to the control unit detecting that the order was removed from the to-go cubby.

Figure 18:
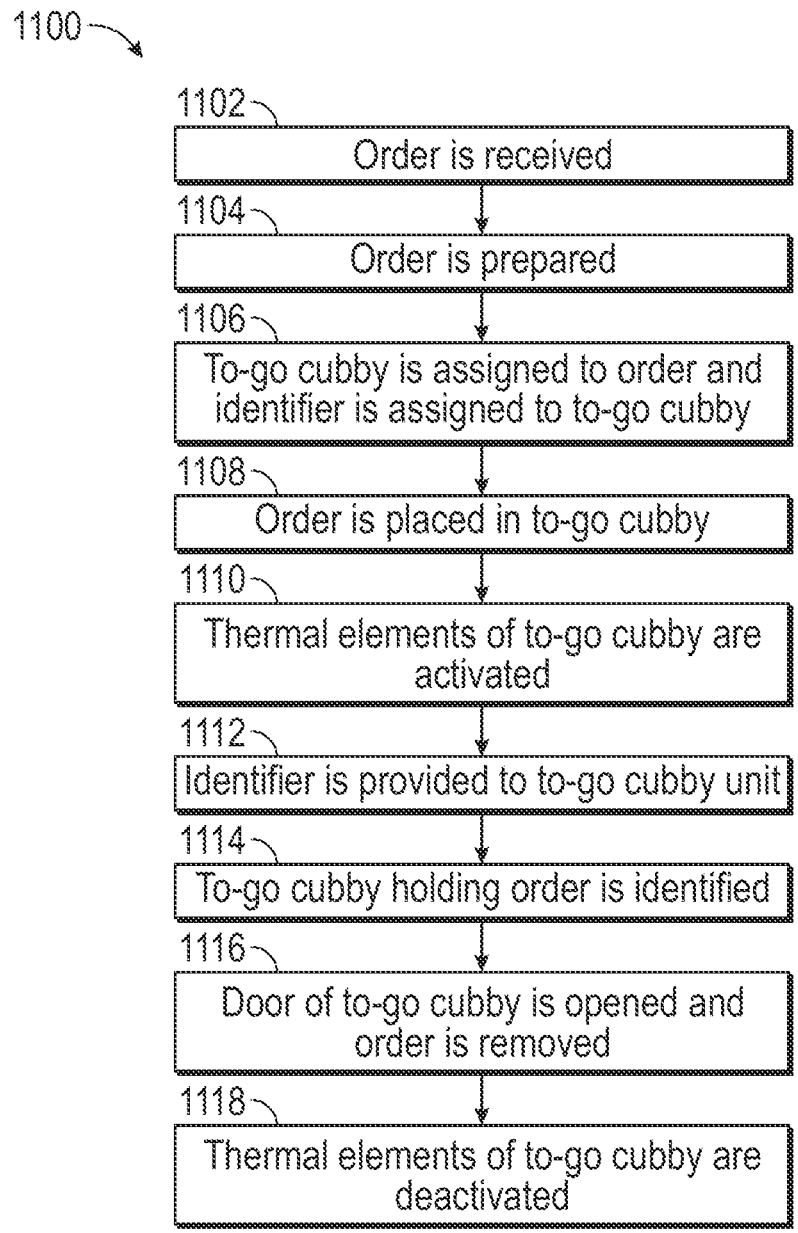
FIG. 18 is a method for receiving an order from a customer and providing the order to the customer via a cubby unit, according to another exemplary embodiment.

Referring now to FIG. 18, a method 1100 for receiving an order from a customer and providing the order to the customer via a to-go cubby unit is shown, according to another exemplary embodiment. At step 1102, an order is received from a customer. By way of example, the order may be made by the customer through a mobile application (e.g., a restaurant ordering application, etc.), a website (e.g., a restaurant website, et.), a phone order, at a register within a restaurant, directly at a to-go cubby unit (e.g., the to-go cubby unit 10, etc.) etc. The order may be entered into a POS system (e.g., the POS system 500, via the server 440, via the company devices 430, via the to-go cubby unit 10, etc.). At step 1104, employees are notified of the order (e.g., on the company devices 430, etc.) and the order is prepared.

At step 1106, a to-go cubby (e.g., the to-go cubby 100, etc.) of the to-go cubby unit is assigned to the order and an identifier (e.g., the customer's name, the customer's phone number, an identifier provided by the customer when placing the order, etc.) associated with the order is assigned to the to-go cubby. In one embodiment, a server (e.g., the server 440, etc.) of the POS system assigns the to-go cubby to the order and/or the identifier to the to-go cubby. In another embodiment, the employee manually assigns the to-go cubby to the order and/or the identifier to the to-go cubby (e.g., via the company devices 430, the employee interface 310, etc.). In still another embodiment, the to-go cubby unit assigns the to-go cubby to the order and/or the identifier to the to-go cubby. In some embodiments, a notification (e.g., a text, an email, a mobile application notification, etc.) is sent (e.g., via the server 440, the to-go cubby unit 10, etc.) to the customer (e.g., on their customer device 450, etc.) indicating the to-go cubby assigned to the order.

At step 1108, the order is placed in the to-go cubby (e.g., through the employee door 140 thereof, through the customer door 130 thereof, through an opening in the to-go cubby, etc.) of the to-go cubby unit. At step 1110, thermal elements (e.g., the thermal elements 170, etc.) of the to-go cubby are activated. In one embodiment, the thermal elements are manually activated by the employee and the temperature is manually set by the employee (e.g., via a thermostat for the to-go cubby 100, via the employee interface 310, via the company devices 430, etc.). In another embodiment, the thermal elements are automatically activated and the temperature is automatically set by a control unit (e.g., the control unit 400, the controller 410, etc.) of the to-go cubby unit (e.g., based on optical recognition, based on an identifier read on the order, based on a RFID tag read on the order, based on the order details, etc.).

At step 1112, the identifier is provided to the to-go cubby unit (e.g., in response to the to-go cubby unit requesting the identifier from the customer, etc.). In one embodiment, the identifier is provided to an interface (e.g., the customer interface 300, etc.) of the to-go cubby unit by the customer. In another embodiment, the identifier is provided to the to-go cubby unit by a personal device of the customer (e.g., the customer device 450, etc.) and transmitted to the to-go cubby unit when the customer is in short-range communication of the to-go cubby unit. At step 1114, the to-go cubby holding the order is identified (e.g., in response to the identifier being a valid identifier, etc.). In one embodiment, the to-go cubby holding the order is identified on the interface of the to-go cubby unit. In another embodiment, the to-go cubby holding the order is identified by illuminating a lighting element (e.g., the lighting element 160, etc.) within the to-go cubby unit (e.g., which shines through the transparent panel 132, etc.). In other embodiments, the to-go cubby holding the order is identified by activating an indicator (e.g., a display, a light, a speaker that emits sound identifier, etc.) on a door of the to-go cubby (e.g., the customer door 130, etc.). In still other embodiments, the to-go cubby holding the order is identified on the personal device of the customer.

At step 1116, the door of the to-go cubby is opened (e.g., manually, automatically, etc.) and the order is removed by the customer. At step 1118, the thermal elements are deactivated. In one embodiment, the thermal elements are manually deactivated by an employee. In another embodiment, the thermal elements are automatically deactivated by the control unit after a set time period. In other embodiments, the thermal elements are automatically deactivated by the control unit in response to the control unit detecting that the order was removed from the to-go cubby.

Figure 19:
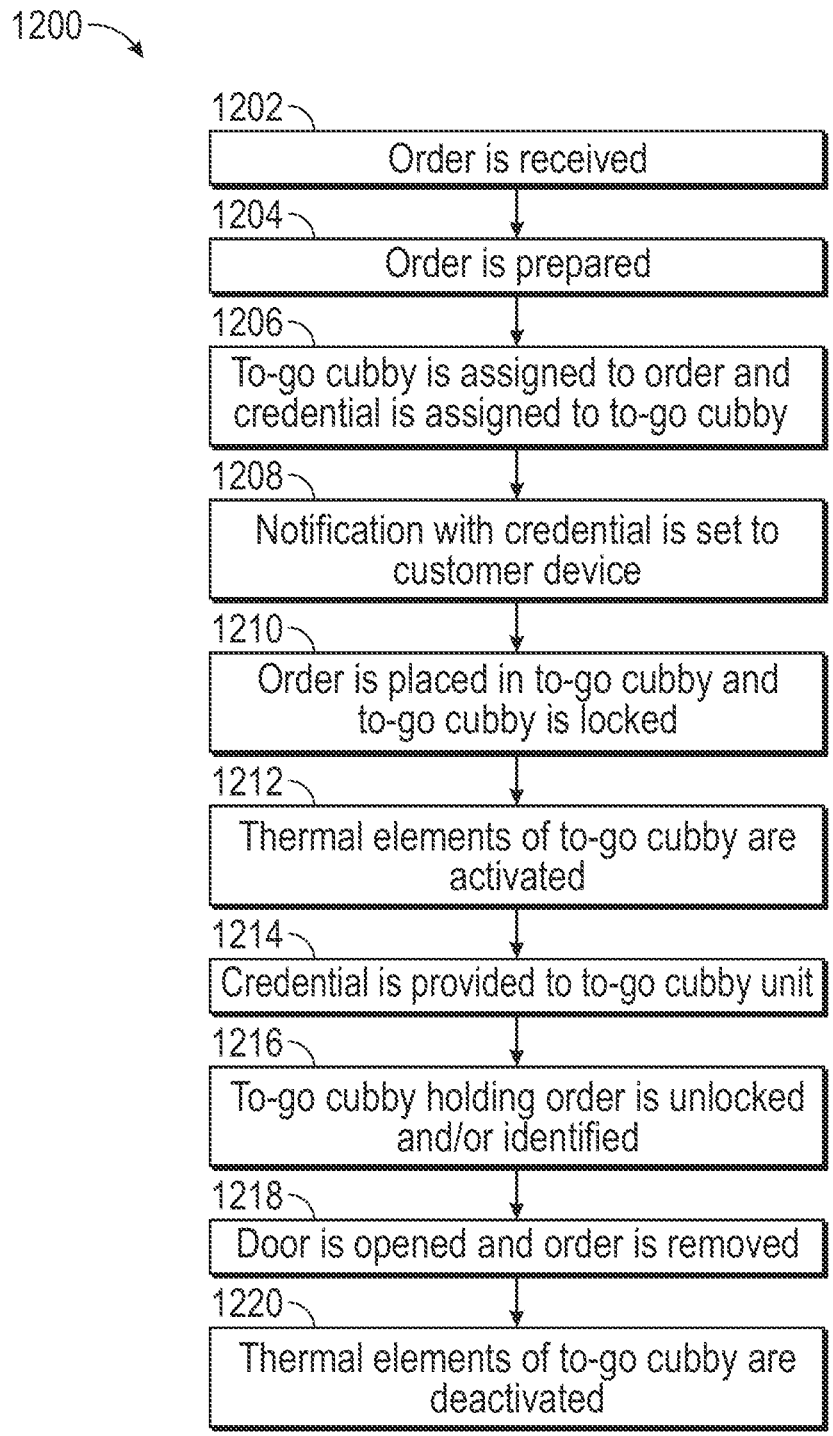
FIG. 19 is a method for receiving an order from a customer and providing the order to the customer via a cubby unit, according to still another exemplary embodiment.

Referring now to FIG. 19, a method 1200 for receiving an order from a customer and providing the order to the customer via a to-go cubby unit is shown, according to still another exemplary embodiment. At step 1202, an order is received from a customer. By way of example, the order may be made by the customer through a mobile application (e.g., a restaurant ordering application, etc.), a website (e.g., a restaurant website, et.), a phone order, at a register within a restaurant, directly at a to-go cubby unit (e.g., the to-go cubby unit 10, etc.) etc. The order may be entered into a POS system (e.g., the POS system 500, via the server 440, via the company devices 430, via the to-go cubby unit 10, etc.). At step 1204, employees are notified of the order (e.g., on the company devices 430, etc.) and the order is prepared.

At step 1206, a to-go cubby (e.g., the to-go cubby 100, etc.) of the to-go cubby unit is assigned to the order and a credential (e.g., the customer's name, the customer's phone number, an order ID, a customer biometric, a mobile credential, a PIN, a password, a barcode, a QR code, etc.) associated with the order is assigned to the to-go cubby. In one embodiment, a server (e.g., the server 440, etc.) of the POS system assigns the to-go cubby to the order and/or the credential to the to-go cubby. In another embodiment, the employee manually assigns the to-go cubby to the order and/or the credential to the to-go cubby (e.g., via the company devices 430, the employee interface 310, etc.). In still another embodiment, the to-go cubby unit assigns the to-go cubby to the order and/or the credential to the to-go cubby. At step 1208, a notification (e.g., a text, an email, a mobile application notification, etc.) is sent (e.g., via the server 440, the to-go cubby unit 10, etc.) to the customer (e.g., on their customer device 450, etc.) providing the credential and/or indicating the to-go cubby assigned to the order.

At step 1210, the order is placed in the to-go cubby (e.g., through the employee door 140 thereof, through the customer door 130 thereof, etc.) of the to-go cubby unit and a door (e.g., the customer door 130, etc.) is locked (e.g., using the locking mechanism 150, etc.) by a control unit (e.g., the control unit 400, the controller 410, etc.) of the to-go cubby unit. In some embodiments, the door is not locked. At step 1212, thermal elements (e.g., the thermal elements 170, etc.) of the to-go cubby are activated. In one embodiment, the thermal elements are manually activated by the employee and the temperature is manually set by the employee (e.g., via a thermostat for the to-go cubby 100, via the employee interface 310, via the company devices 430, etc.). In another embodiment, the thermal elements are automatically activated and the temperature is automatically set by the control unit (e.g., based on optical recognition, based on an identifier read on the order, based on a RFID tag read on the order, based on the order details, etc.).

At step 1214, the credential is provided to the to-go cubby unit (e.g., in response to the to-go cubby unit requesting the credential from the customer, automatically when the customer device 450 is in short-range communication, etc.). In one embodiment, the credential is provided to an interface (e.g., the customer interface 300, etc.) of the to-go cubby unit by the customer. In another embodiment, the credential is provided to the to-go cubby unit by a personal device of the customer (e.g., the customer device 450, entered by the customer, pre-stored on the personal device, transmitted to the to-go cubby unit when the customer is in short-range communication of the to-go cubby unit, scanned from a display of the personal device, etc.). At step 1216, the to-go cubby holding the order is unlocked and/or identified (e.g., in response to the credential being a valid credential, etc.). In one embodiment, the to-go cubby holding the order is identified on the interface of the to-go cubby unit. In another embodiment, the to-go cubby holding the order is identified by illuminating a lighting element (e.g., the lighting element 160, etc.) within the to-go cubby unit (e.g., which shines through the transparent panel 132, etc.). In other embodiments, the to-go cubby holding the order is identified by activating an indicator (e.g., a display, a light, a speaker, etc.) on the door of the to-go cubby. In still other embodiments, the to-go cubby holding the order is identified on the personal device of the customer.

At step 1218, the door of the to-go cubby is opened (e.g., manually, automatically, etc.) and the order is removed by the customer. At step 1220, the thermal elements are deactivated. In one embodiment, the thermal elements are manually deactivated by an employee. In another embodiment, the thermal elements are automatically deactivated by the control unit after a set time period. In other embodiments, the thermal elements are automatically deactivated by the control unit in response to the control unit detecting that the order was removed from the to-go cubby.

Figure 20:
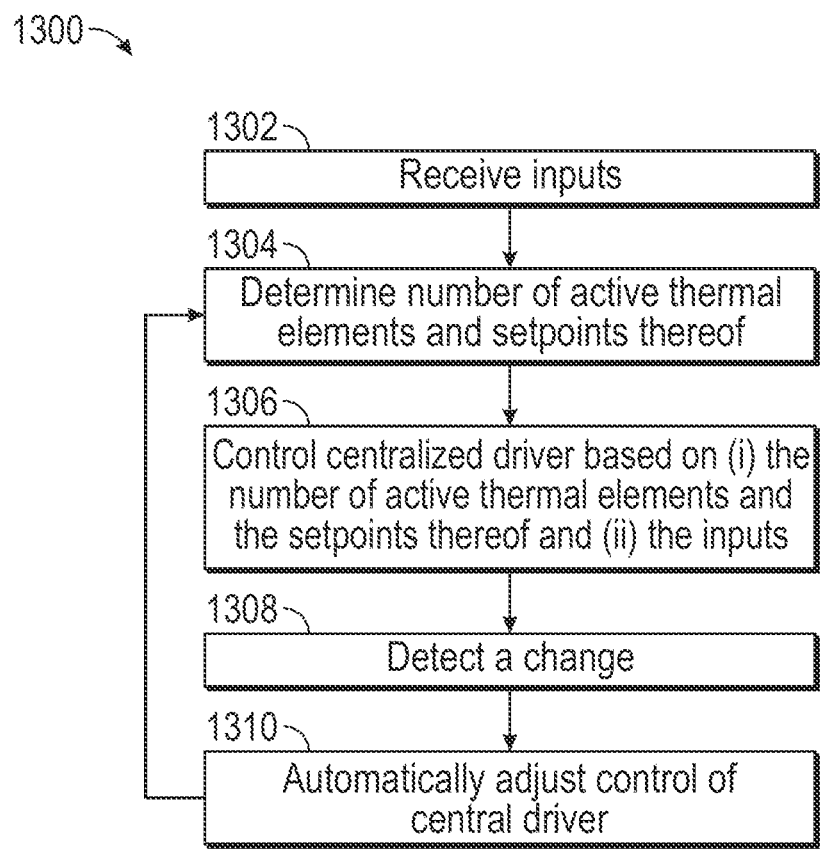
FIG. 20 is a method for controlling a centralized thermal management system of a cubby unit, according to an exemplary embodiment.

Referring now to FIG. 20, a method 1300 for controlling a centralized thermal management system of a cubby unit is shown, according to an exemplary embodiment. At step 1302, a control system (e.g., the control unit 400, the controller 410, etc.) is configured to receive inputs. The inputs may include a selection of a to-go cubby (e.g., the to-go cubby 100, etc.) of a to-go cubby unit (e.g., the to-go cubby unit 10, etc.), a temperature setpoint for the to-go cubby unit, order information regarding an order placed within or to be placed within the to-go cubby, and/or other information or settings. At step 1304, the control system is configured to determine a number of thermal elements (e.g., the thermal elements 170, etc.) and the setpoints of each of the thermal elements that are currently active. At step 1306, the control system is configured to control a central driver (e.g., the central driver 322, etc.) connected to the thermal elements based on (i) the number of active thermal elements and the setpoints thereof and (ii) the inputs (e.g., indicating the activation of additional thermal elements and setpoints thereof).

At step 1308, the control system is configured to detect a change. The change may include receiving additional inputs (e.g., to activate other cubbies, to deactivate other cubbies, a change in the temperature of a to-go cubby (in response to a customer opening the to-go cubby), etc.). At step 1310, the control unit is configured to automatically adjust control of the central driver to accommodate for the change (e.g., to maintain a setpoint temperature within each of the active to-go cubbies, etc.).

While the to-go cubby unit 10 has mainly been described herein as a to-go cubby unit for to-go food orders, it should be understood that the to-go cubby unit 10 could be applied for any type of pre-ordered goods or in-store pickup goods. By way of example, the to-go cubby unit 10 may be used by retailers (e.g., clothing retailers, electronics retailers, etc.) for in-store pickup orders. In such an implementation, the to-go cubby unit 10 may not include the thermal elements 170.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the to-go cubby unit 10, the to-go cubbies 100, and the POS system 500 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A cubby unit comprising:
 a plurality of cubbies, each of the plurality of cubbies including:
  a cubby housing defining an internal compartment;
  a light disposed within the internal compartment; and
  a door coupled to the cubby housing, the door facilitates accessing the internal compartment of the cubby housing, at least a portion of the door is transparent;
 one or more processing circuits including one or more memory devices coupled to one or more processors, the one or more memory devices storing instructions thereon that, when executed by the one or more processors, cause the one or more processors to:
  acquire access information;
  determine whether the access information is associated with a respective order within a respective cubby of the plurality of cubbies; and activate the light of the respective cubby in response to the access information being associated with the respective order such that light emitted by the light shines through the portion of the door that is transparent of the respective cubby to indicate in which one of the plurality of cubbies the respective order is located; and a human-machine interface configured to provide a plurality of graphical user interfaces including:

a first interface that provides a plurality of selectable cubby tiles, each of the plurality of selectable cubby tiles displaying an identifier associated with a respective one of the plurality of cubbies, the plurality of selectable cubby tiles (a) indicate which of the plurality of cubbies are occupied cubbies, (b) indicate which of the plurality of cubbies are unoccupied cubbies, and (c) facilitate manual assignment of a respective unoccupied cubby to the respective order by selecting a respective cubby tile of the plurality of selectable cubby tiles associated with the respective unoccupied cubby through the first interface; and a second interface provided in response to the respective cubby tile being selected through the first interface, the second interface providing a keyboard that facilitates entering order information associated with the respective order to associate the respective order with the respective unoccupied cubby.

2. The cubby unit of claim 1, wherein the access information is transmitted to a customer associated with the respective order by at least one of the cubby unit or an external system separate from the cubby unit.

3. The cubby unit of claim 1, wherein the access information is acquired from a customer through the human-machine interface.

4. The cubby unit of claim 1, further comprising a communications interface, wherein the access information is acquired wirelessly from a device of a customer using the communications interface.

5. The cubby unit of claim 1, further comprising a scanner, wherein the access information is acquired using the scanner.

6. The cubby unit of claim 1, further comprising a thermal management system configured to facilitate thermally regulating a temperature of a product selectively received within the internal compartment of at least one of the plurality of cubbies.

7. The cubby unit of claim 6, wherein the one or more memory devices store instructions thereon that, when executed by the one or more processors, cause the one or more processors to:

acquire an indication regarding a characteristic of the product received by the internal compartment; and control the thermal management system to regulate the temperature of the product based on the indication.

8. The cubby unit of claim 6, wherein the one or more memory devices store instructions thereon that, when executed by the one or more processors, cause the one or more processors to control the thermal management system following removal of the product from the internal compartment such that the respective cubby is not thermally regulated.

9. The cubby unit of claim 1, wherein each of the plurality of cubbies includes a locking mechanism positioned to selectively lock and unlock the door, and wherein the one or more memory devices store instructions thereon that, when executed by the one or more processors, cause the one or more processors to disengage the locking mechanism of the respective cubby to unlock the door of the respective cubby in response to the access information being associated with the respective order.

10. The cubby unit of claim 1, wherein activating the light includes flashing the light.

11. The cubby unit of claim 1, wherein the door is a first door coupled to a first side of the cubby housing, and wherein each of the plurality of cubbies include a second door coupled to an opposing second side of the cubby housing.

12. The cubby unit of claim 11, wherein at least a portion of the second door is transparent.

13. The cubby unit of claim 11, wherein the human-machine interface is a first human-machine interface positioned on a first side of the cubby unit, further comprising:

a second human-machine interface positioned on an opposing second side to the cubby unit to facilitate entry or acquisition of the access information.

14. A cubby unit comprising:

a plurality of cubbies, each of the plurality of cubbies including:

a cubby housing defining an internal compartment; and a door coupled to the cubby housing, the door facilitates accessing the internal compartment of the cubby housing; and a human-machine interface configured to provide a plurality of graphical user interfaces including:

a first interface that provides a plurality of selectable cubby tiles, each of the plurality of selectable cubby tiles displaying an identifier associated with a respective one of the plurality of cubbies, the plurality of selectable cubby tiles (a) indicate which of the plurality of cubbies are occupied cubbies, (b) indicate which of the plurality of cubbies are unoccupied cubbies, and (c) facilitate manual assignment of a respective unoccupied cubby to the respective order by selecting a respective cubby tile of the plurality of selectable cubby tiles associated with the respective unoccupied cubby through the first interface; and a second interface provided in response to the respective cubby tile being selected through the first interface, the second interface providing a keyboard that facilitates entering order information associated with the respective order to associate the respective order with the respective unoccupied cubby.

15. The cubby unit of claim 14, wherein the plurality of graphical user interfaces includes a third interface providing the identifier associated with the respective unoccupied cubby that instructs a user to place the respective order in the respective unoccupied cubby manually assigned by the user in response to the order information being received.

16. The cubby unit of claim 14, wherein a selectable cubby tile of the first interface assigned to an occupied cubby indicates to which order the occupied cubby is associated and includes a timer indicating how long the occupied cubby has been occupied.

* * * * *